United States Patent [19]
Akeda

[11] Patent Number: 5,801,369
[45] Date of Patent: Sep. 1, 1998

[54] METHOD FOR FORMING COMPACT BAR CODE INCLUDING DATA BARS AND REFERENCE BARS

[75] Inventor: Satoko Akeda, Kanagawa, Japan

[73] Assignee: NEC Corporation, Tokyo, Japan

[21] Appl. No.: 771,398

[22] Filed: Dec. 19, 1996

[30] Foreign Application Priority Data

Dec. 21, 1995 [JP] Japan .................. 7-333065

[51] Int. Cl.$^6$ ............................................. G06K 7/10
[52] U.S. Cl. .................................. 235/463; 235/462
[58] Field of Search ............................. 235/462, 463

[56] References Cited

U.S. PATENT DOCUMENTS 5,682,028  10/1997  Coleman ........................... 235/462

FOREIGN PATENT DOCUMENTS 59-170973  9/1984  Japan .
61-180380  8/1986  Japan .
3-73081    3/1991  Japan .

*Primary Examiner*—Harold Pitts
*Attorney, Agent, or Firm*—Scully, Scott, Murphy & Presser

[57] ABSTRACT

In a method for forming a bar code, a data pattern comprised of narrow bars and wide bars is prepared. In this case, a width ratio of one of said narrow bars to one of said wide bars being definite. Also, a reference pattern comprised of reference bars each having the same width as said narrow bars is prepared. Then, transitions of bars are OR-logically extracted from a parallel combination of said data pattern and said reference pattern. Black level bars and white level bars are allocated alternately between the transitions.

11 Claims, 25 Drawing Sheets

METHOD FOR FORMING COMPACT BAR CODE INCLUDING DATA BARS AND REFERENCE BARS

BACKGROUND OF THE INVENTION

1. Field of the Invention

The present invention relates to a bar code forming method and a bar code reading system.

2. Description of the Related Art

As bar codes, there are normalized bar codes and unnormalized bar codes. The normalized bar codes are printed as product codes and prices on labels for goods. On the other hand, the unnormalized bar codes are used for video cassette recoders (VTRs). In the latter bar codes, reservation days, times and intervals are printed thereon, and the bar codes are scanned by users to reserve programs.

A first prior art bar code reading system includes a bar code formed by narrow bars and wide bars, a bar code scanner and a bar code decoding circuit. A bar width data obtained from the bar code sensed by the bar code scanner is compared with a definite threshold value by the bar code decoding circuit to obtain a bar code. This will be explained later in detail.

In the first prior art bar code reading system, however, the bar width data depends upon the scanning speed of the bar code scanner, while the threshold value is constant. Therefore, if the scannig speed fluctuates, it is impossible to accurately determine the bar width of the bars.

In a second prior art bar code reading system, the threshold value depends upon the scanning speed of the bar code scanner (see: JP-A-59-170973 & JP-A-61-180380). This will also be explained later in detail.

In the second prior art bar code reading system, however, since the threshold value does not completely depend upon the scanning speed of the bar code scanner, if the scanning speed greatly fluctuates, so that the threshold value cannot follow the fluctuation of the scanning speed, it is still impossible to accurately determine the bar width of the data bars.

In a third prior art bar code reading system, a bar code scanner having five sensors is provided. In this case, two of the sensors are used for detecting a transition from a black bar to a white bar or vice versa, and the others of the sensors are used for determining whether a detected bar is narrow or wide. Thus, a bar width can be accurately detected irrespective of the scanning speed of the bar code scanner (see: JP-A-3-730812). This will also be explained later in detail.

In the third prior art bar code reading system, however, since the number of sensors is large, the manufacturing cost of the system is increased.

In a fourth prior art bar code reading system, a bar code is formed by data bars and reference bars, and a bar code scanner is formed by two sensors for the data bars and the reference bars. Thus, since the data bars are compared with the reference bars in close proximity to the data bars, a bar width of the data bars can be accurately detected irrespective of the scanning speed of the bar code scanner. This will also be explained later in detail.

In the fourth prior art bar code reading system, however, since the number of sensors is two, the manufacturing cost of the system is increased. Also, since two kinds of bar codes are required, a label on which such bar codes are printed becomes large, and an erroneous reading operation may occur due to the deviation of the two bar codes on the label.

SUMMARY OF THE INVENTION

It is an object of the present invention to provide a method for forming a small bar code in which bar width can be accurately determined irrespective of the sensing speed.

Another object is to provide a bar code reading method and apparatus for reading the above-mentioned bar code.

According to the present invention, in a method for forming a bar code, a data pattern comprised of narrow bars and wide bars is prepared. In this case, a width ratio of one of the narrow bars to one of the wide bars is definite. Also, a reference pattern comprised of reference bars each having the same width as the narrow bars is prepared. Then, transitions of bars are OR-logically extracted from a parallel combination of the data pattern and the reference pattern. Black level bars and white level bars are allocated alternately between the transitions.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENT

Before the description of the preferred embodiment, prior art bar codes and prior art bar code reading methods will be explained with reference to FIGS. 1, 2, 3, 4, 5, 6, 7, 8, 9, 10A, 10B, 11, 12, 13, 14 and 15A through 15E.

Figure 1:
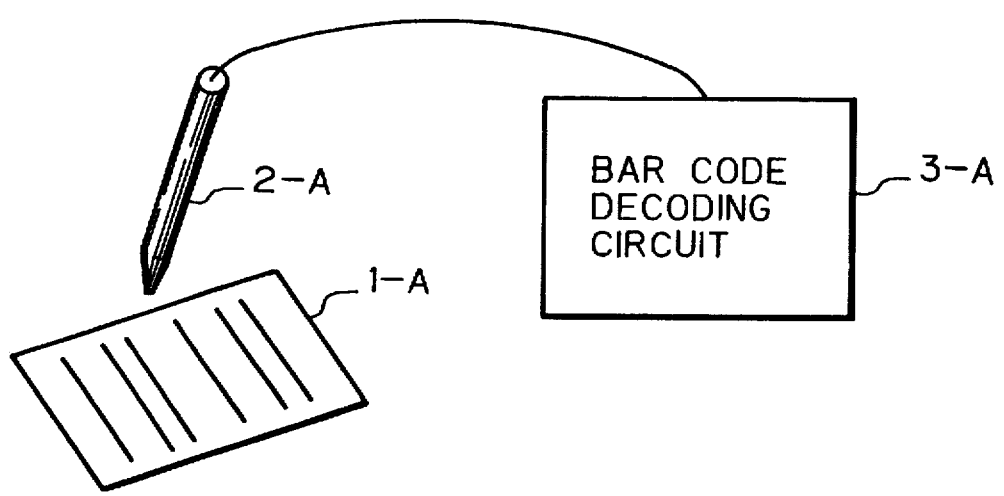
FIG. 1 is a diagram illustrating a first prior art bar code reading system.

In FIG. 1, which illustrates a first prior art bar code reading system, reference numeral 1-A designates a bar code formed by narrow bars and wide bars. The bar code 1-A is usually printed on a label. The bar code 1-A is scanned by a bar code scanner 2-A whose output signal is supplied to a bar code decoding circuit 3-A. In this case, in a first mode, the bar code scanner 2-A is completely manually operated to scan the bar code 1-A. In a second mode, after the bar code scanner 2-A is put on the bar code 1-A, the bar code scanner 2-A is antomatically operated to scan the bar code 1-A. Note that the bar code scanner 2-A and the bar code decoding circuit 3-A constitute a bar code reading apparatus.

Figure 2:
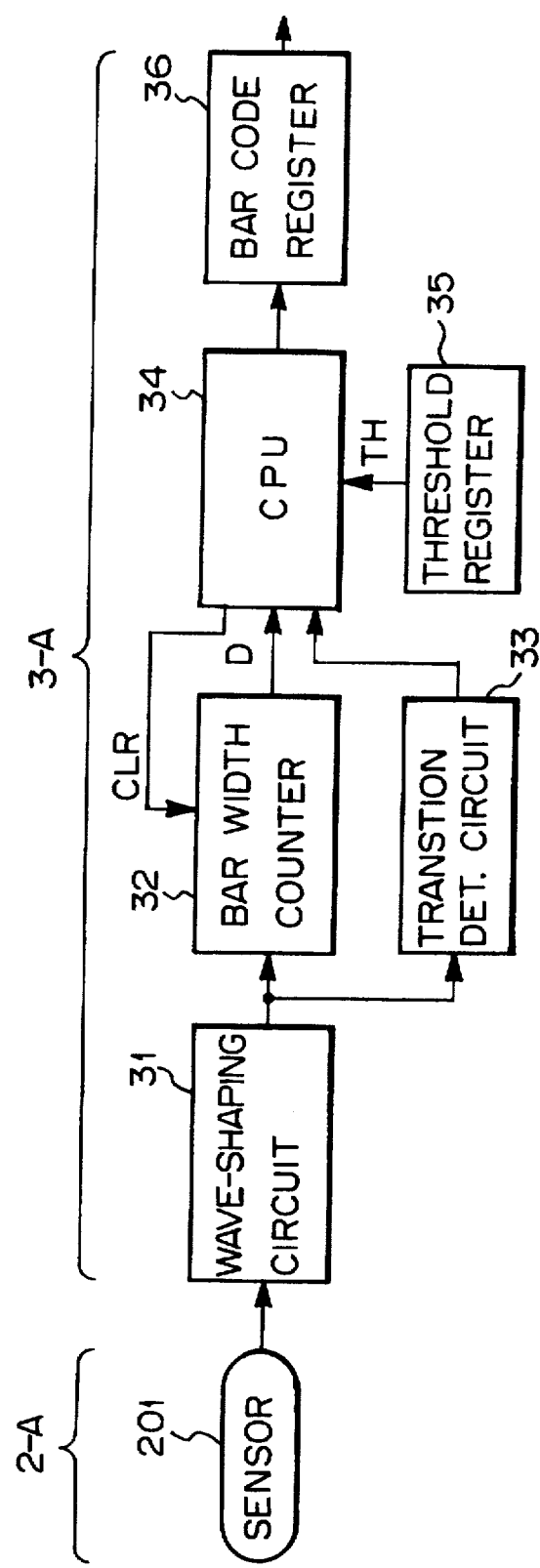
FIG. 2 is a block circuit diagram of the bar code decoding circuit of FIG. 1.

In FIG. 2, which is a detailed block circuit diagram of the bar code decoding circuit 3-A of FIG. 1, the bar code decoding circuit 3 includes a wave-shaping circuit 31 for performing a wave-shaping operation upon the output of a sensor 201 of the bar code scanner 2-A, a bar width counter 32, a transition detection circuit 33, a central processing unit (CPU) 34, a threshold value register 35 for storing a definite threshold value TH, and a bar code register 36 for storing decoded bar codes.

Figure 3:
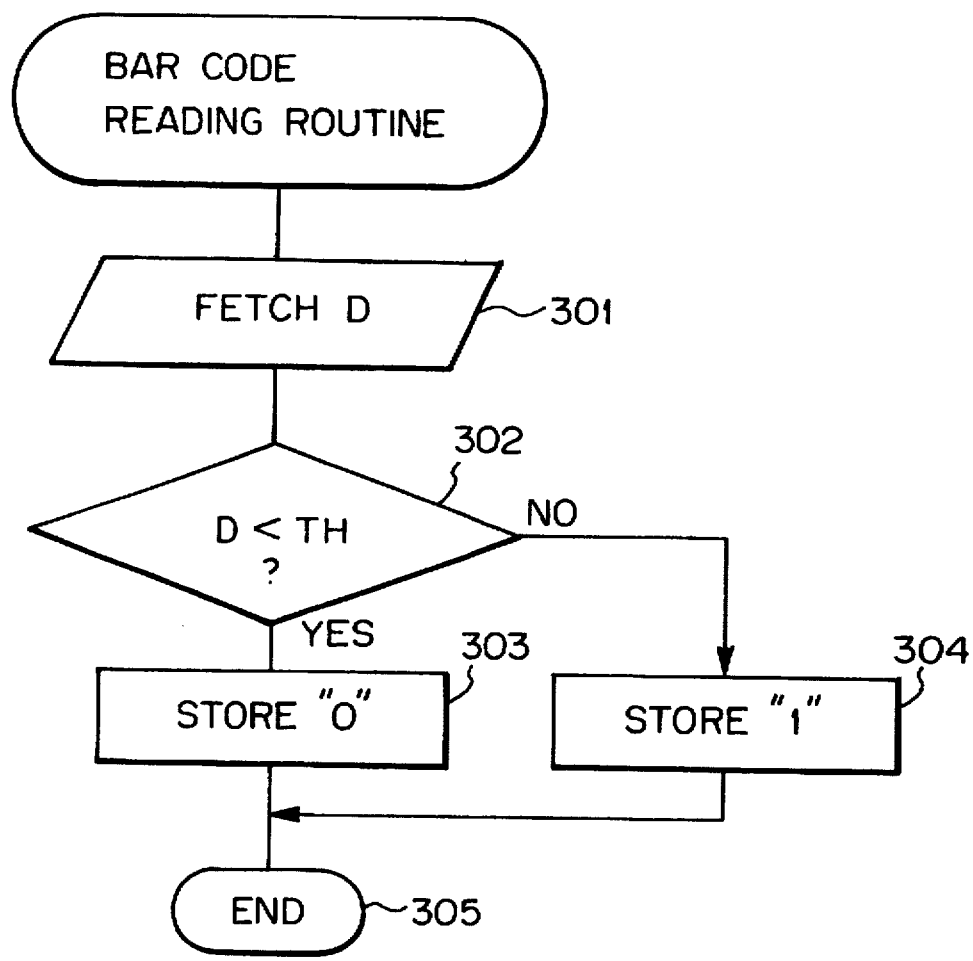
FIG. 3 is a flowchart showing the operation of the CPU of FIG. 2.

The operation of the CPU 34 of FIG. 2 is explained next with reference to FIG. 3. The operation shown in the flowchart of FIG. 3 is initiated by a transition signal of the transition detection circuit 33 which is generated when the output signal of the wave-shaping circuit 31 is switched from low to high and vice versa.

First, at step 301, a bar width data D is fetched from the bar width counter 32. Then, the bar width counter 32 is cleared by a clear signal CLR.

Next, at step 302, it is determined whether or not D is smaller than the threshold value TH stored in the threshold value register 35. As a result, when D<TH, the control proceeds to step 303 which stores "0" in the bar code register 36. Contrary to this, if D≧TH, the control proceeds to step 304 which stores "1" in the bar code register 36.

Finally, this routine is completed by step 305.

In the first prior art bar code reading system as illustrated in FIGS. 1, 2 and 3, however, the bar width data D depends upon the scanning speed of the bar code scanner 2-A, while the threshold value TH is constant. Therefore, if the scanning speed fluctuates, it is impossile to accurately determine the bar width of the data bars.

Figure 4:
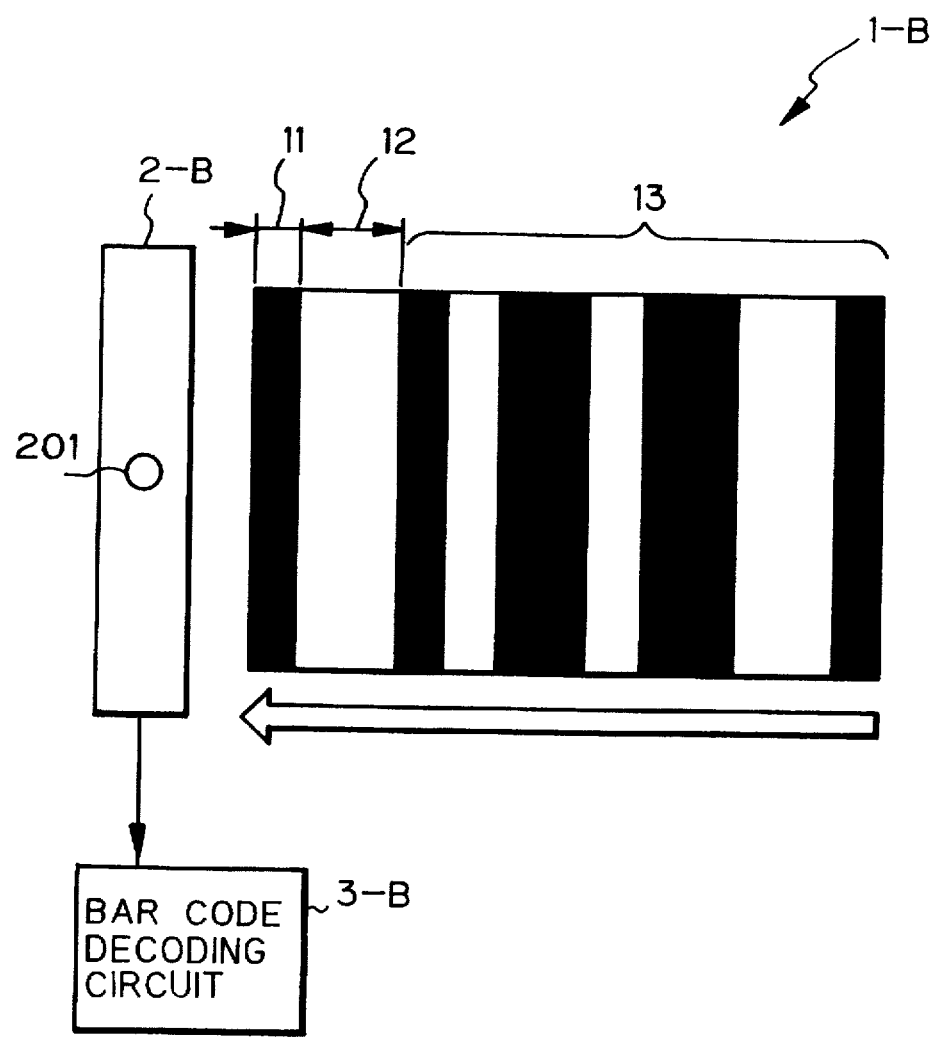
FIG. 4 is a diagram illustrating a second prior art bar code reading system.

In FIG. 4, which illustrates a second prior art bar code reading system, a bar code 1-B includes a start code formed by a narrow bar 11 and a wide bar 12. Data bars 13 follow the start code. Also, a bar code scanner 2-B which is the same the bar code scanner 2-A of FIG. 1 is provided. Further, a bar code decoding circuit 3-B is provided instead of the bar code decoding circuit 3-A of FIG. 1.

Figure 5:
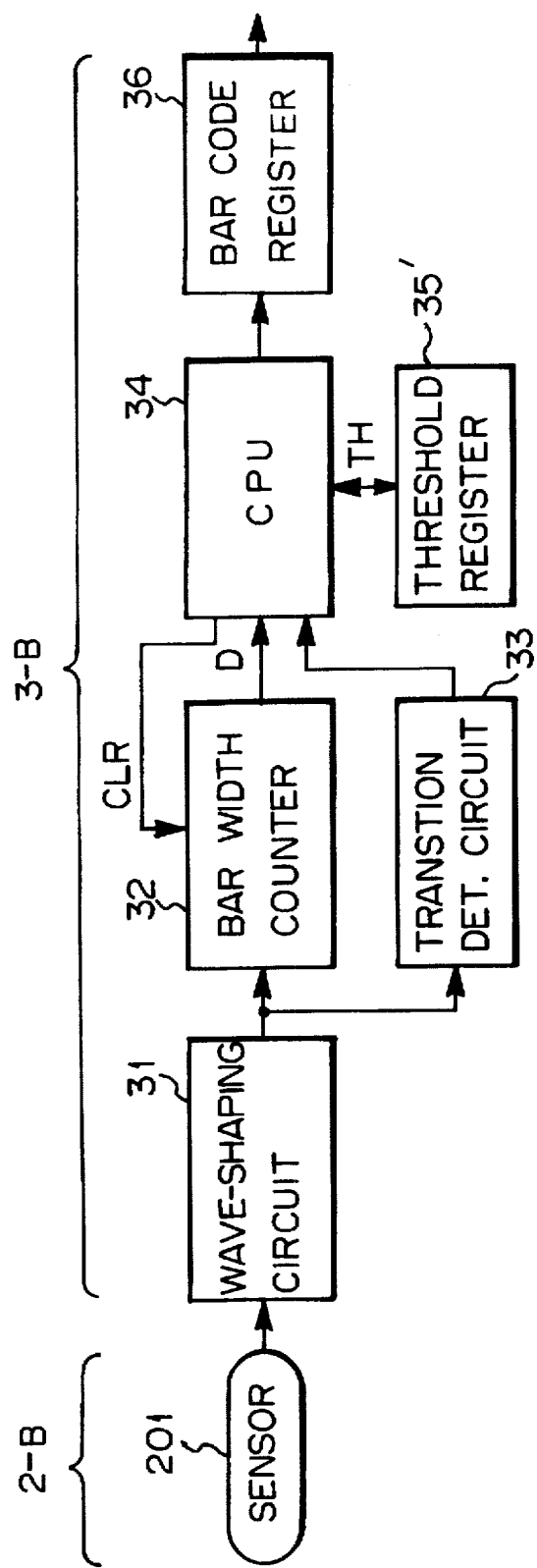
FIG. 5 is a block circuit diagram of the bar code decoding circuit of FIG. 4.

In FIG. 5, which is a detailed block circuit diagram of the bar code decoding circuit 3-B of FIG. 4, a threshold value register 35' is provided instead of the threshold value register 35 of FIG. 2. In this case, the threshold value TH stored in the threshold value register 35' is variable.

Figure 6:
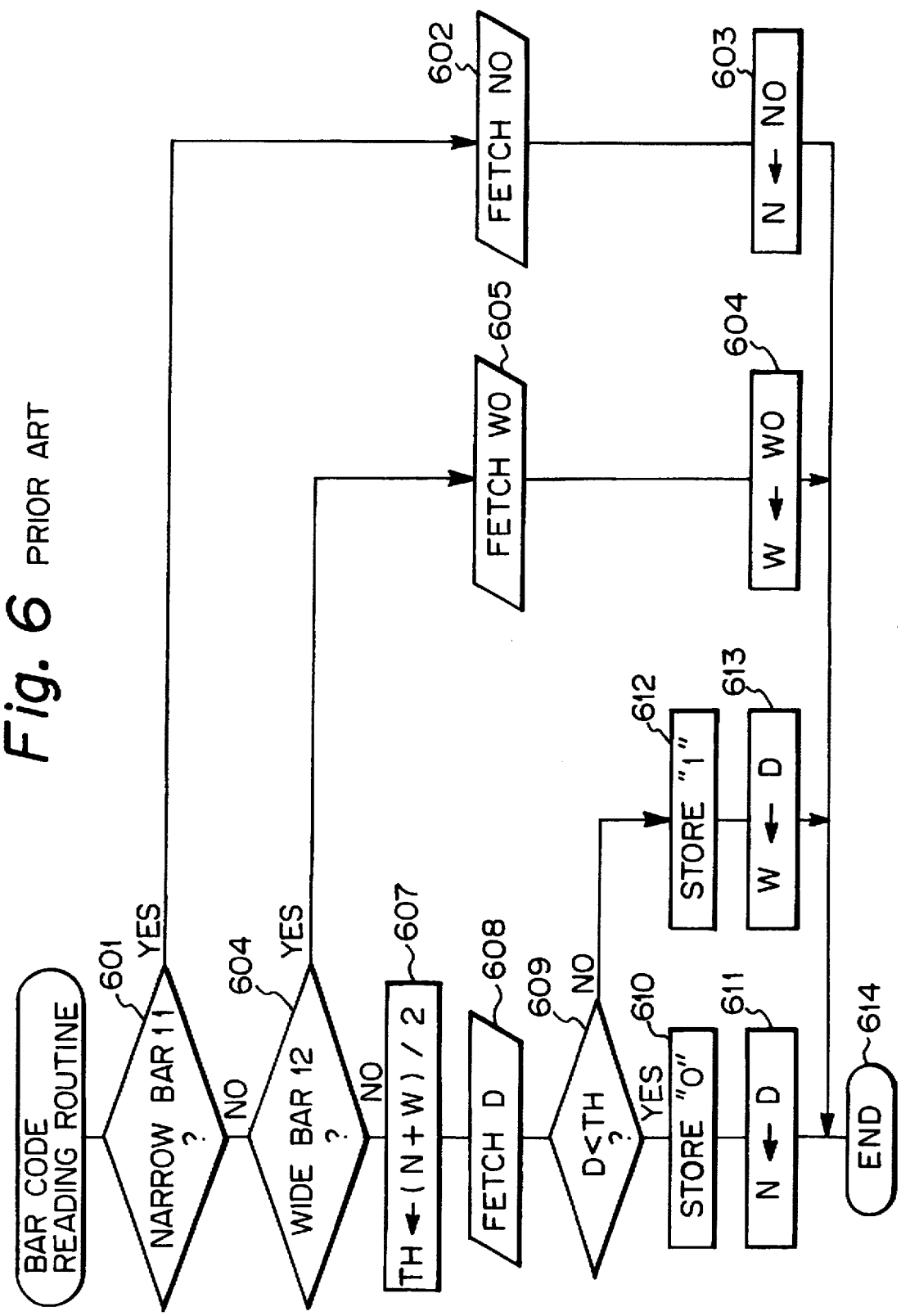
FIG. 6 is a flowchart showing the operation of the CPU of FIG. 5.

The operation of the CPU 34 of FIG. 5 is explained next with reference to FIG. 6. The operation shown in the flowchart of FIG. 6 is also initiated by the transition signal of the transition detection circuit 33.

First, at step 601, it is determined whether or not the narrow bar 11 of the start code is sensed. Only when the narrow bar 11 is sensed, does the control proceed to steps 602 and 603. At step 602, a bar width data N0 of the narrow bar 11 is fetched from the bar width counter 32, and then, the bar width counter 32 is cleared by a clear signal CLR. Also, at step 603, a value N is caused to be N0.

AT step 604, it is determined whether or not the wide bar 12 of the start code is sensed. Only when the wide bar 12 is sensed, does the control proceed to steps 605 and 606. At step 605, a bar width data W0 of the wide bar 12 is fetched from the bar width counter 32, and then, the bar width counter 32 is cleared by a clear signal CLR. Also, at step 603, a value W is caused to be W0.

When neither the narrow bar 11 nor the wide bar 12 is sensed, the control proceeds to step 607.

At step 607, a threshold value TH is calculated by $$TH \leftarrow (N+W)/2$$

Then, the threshold value TH is stored in the threshold value register 35'.

Next, at step 608, a bar width data D of the data bars 13 is fetched from the bar width counter 32. Then, the bar width counter 32 is cleared by a clear signal CLR.

Next, at step 609, it is determined whether or not D is smaller than the threshold value TH stored in the threshold value register 35'. As a result, when D<TH, the control proceeds to step 610 which stores "0" in the bar code register 35. Also, at step 609, the value N is renewed by D, Contrary to this, if D≧TH, the control proceeds to step 612 which stores "1" in the bar code register 35. Also, at step 613, the value W is renewed by D.

Finally, this routine is completed at step 614.

Thus, in the second prior art bar code reading system as illustrated in FIGS. 4, 5 and 6, the bar width data D depends upon the scanning speed of the bar code scanner 2-B, and also, the threshold value TH depends upon the scanning speed of the bar code scanner 2-B. Therefore, even if the scanning speed fluctuates, it is possible to accurately determine the bar width of the data bars.

In the second prior art bar code reading system, however, since the threshold value TH does not always depend upon the two bar width values immediately before the calculation at step 607, if the scanning speed greatly fluctuates so that the threshold value TH cannot follow the fluctuation of the scanning speed, it is still impossible to accurately determine the bar width of the data bars.

Figure 7:
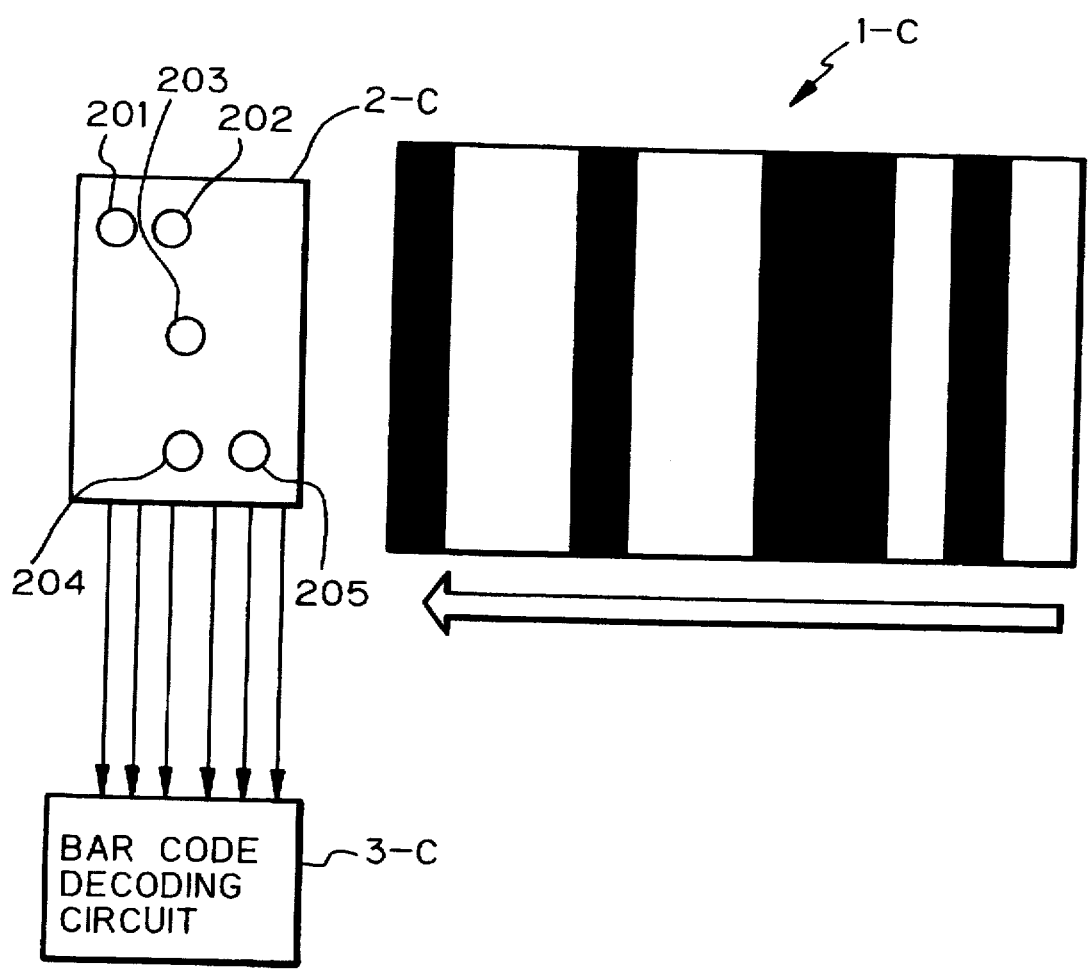
FIG. 7 is a diagram illustrating a third prior art bar code reading system.

In FIG. 7, which illustrates a third prior art bar code reading system, a bar code 1-C is the same as the ar code 1-A of FIG. 1. Also, a bar code scanner 2-C having five sensors 201, 202, 203, 204 and 205 is provided instead of the bar code scanner 2-B of FIG. 4. In this case, the sensors 201 and 202 are used for detecting a transition from a black bar to a white bar or vice versa, and the sensors 203, 204 and 205 are used for determining whether a detected bar is narrow or wide. Further, a bar code decoding circuit 3-C is provided instead of the bar code decoding circuit 3-B of FIG. 4 (see: JP-A-3-730812).

Figure 8:
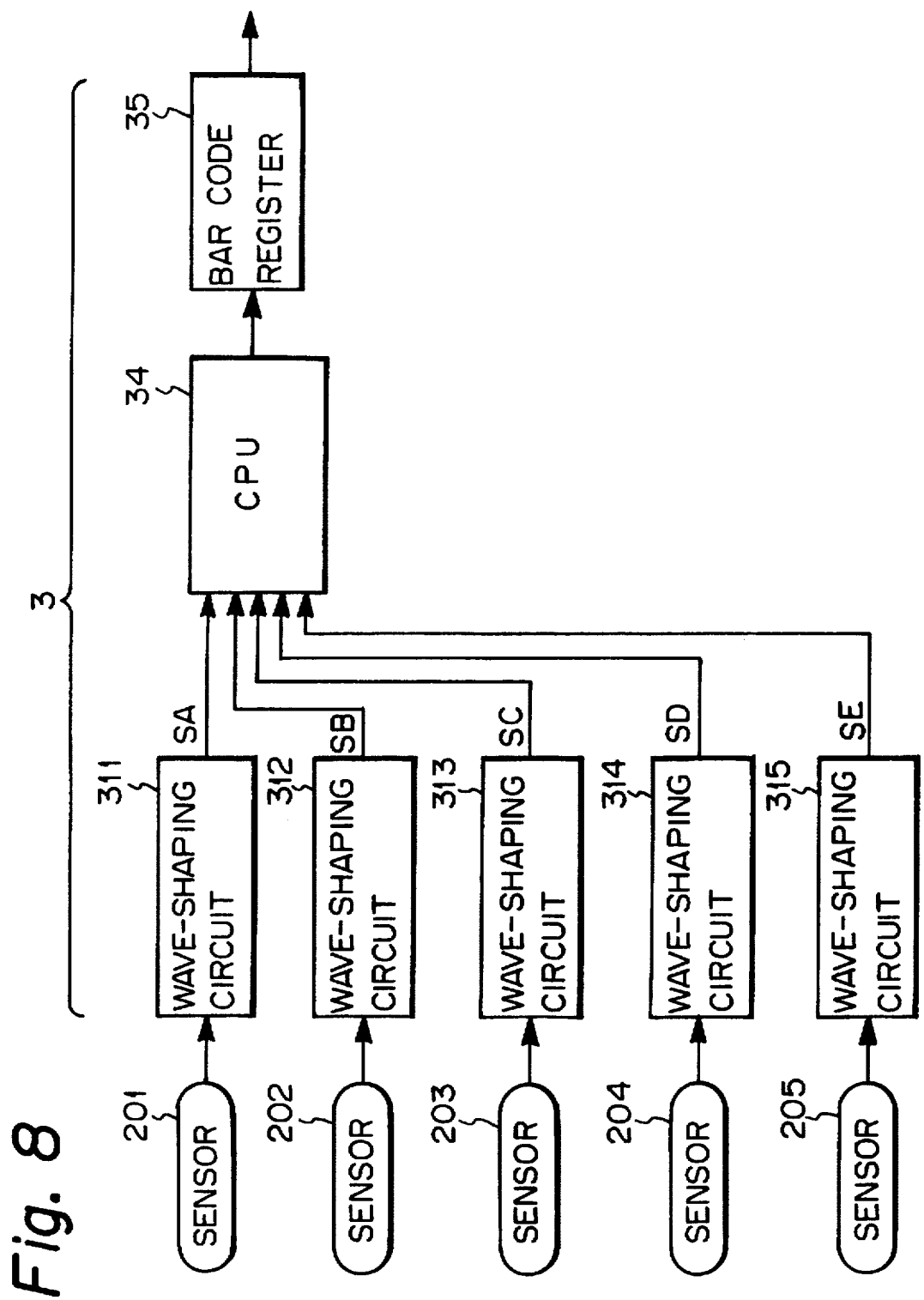
FIG. 8 is a block circuit diagram of the bar code decoding circuit of FIG. 7.

In FIG. 8, which is a detailed block circuit diagram of the bar code decoding circuit 3-C of FIG. 7, five wave-shaping circuits 311, 312, 313, 314 and 315 are provided; however, the bar width counter 32 and the threshold value register 35 (35') of FIGS. 2 and 5 are not provided.

Figure 9:
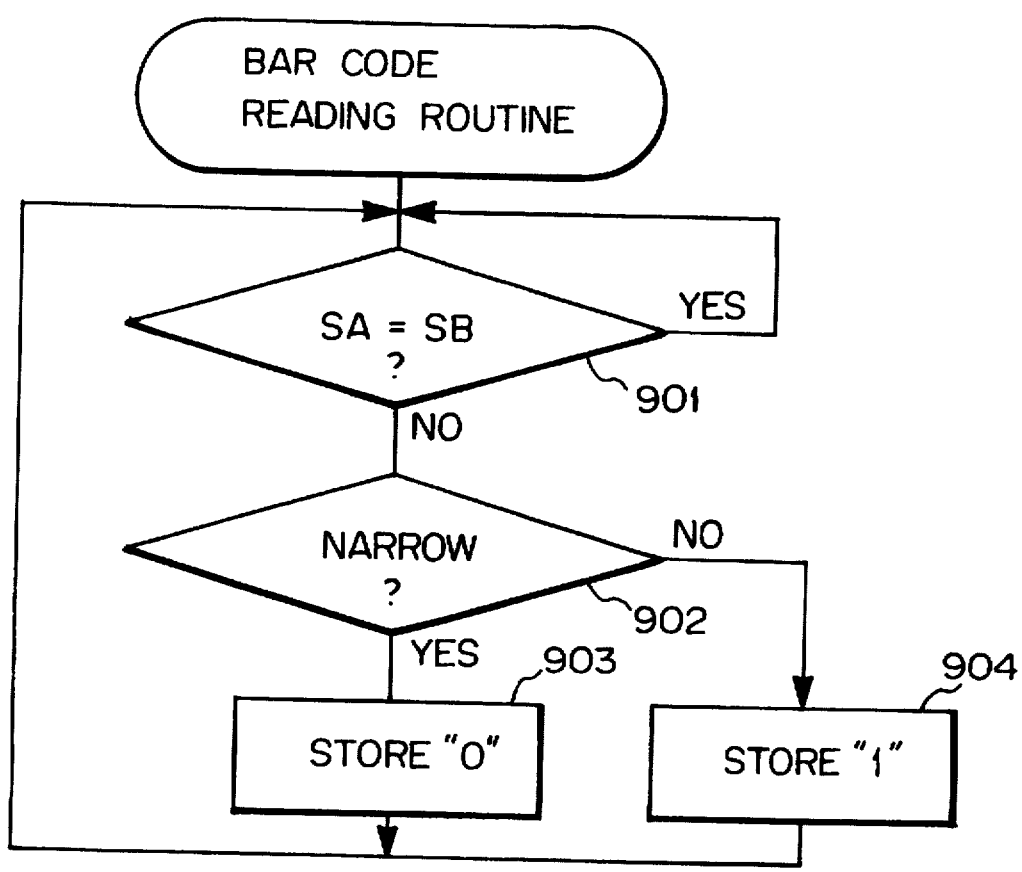
FIG. 9 is a flowchart showing the operation of the CPU of FIG. 8.

The operation of the CPU 34 of FIG. 8 is explained next with reference to FIG. 9.

First, at step 901, it is determined whether or not a transition occurs from a black bar to a white bar or vice versa. That is, it is determined whether or not the output signal SA of the wave-shaping circuit 311 is the same as the output signal SB of the wave-shaping circuit 312. If SA=SB, this means that no transition occurs. If SA≠SB, this means that a transition has occurred. Only when SA≠SB, does the control proceed to step 902. Otherwise, the control remains at step 901.

Figure 10A:
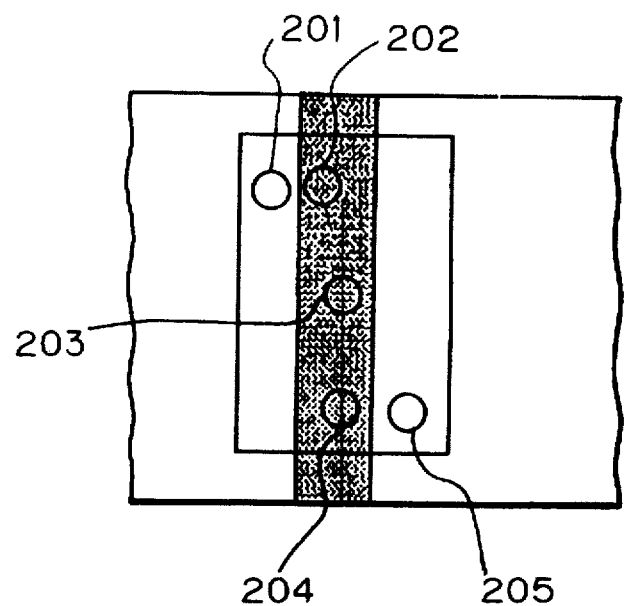
FIGS. 10A and 10B are diagrams showing the operation of the CPU of FIG. 8.
Figure 10B:
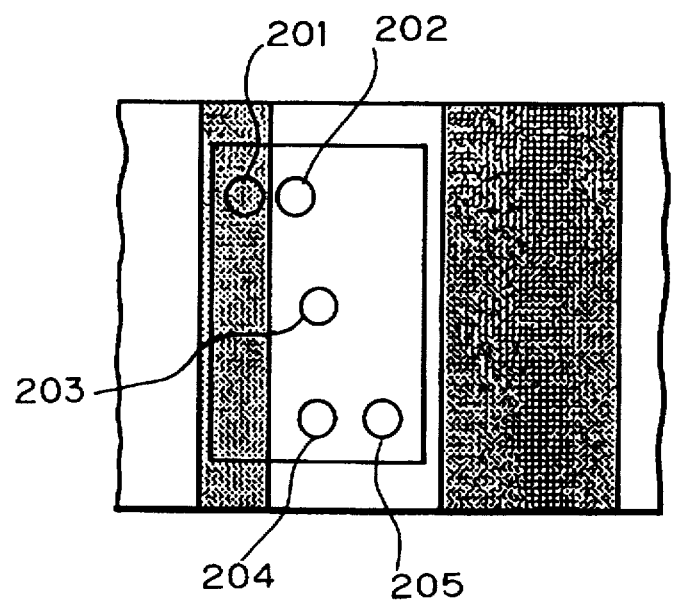

At step 902, it is determined whether a detected bar is narrow or wide. For example, as shown in FIG. 10A, if the output signal SC of the wave-shaping circuit 313 is the same as the output signal SD of the wave-shaping circuit 314 and is different from the output signal SE of the wave-shaping circuit 315, this means that the detected bar is narrow. On the other hand, as shown in FIG. 10B, if the output signal SC of the wave-shaping circuit 313 is the same as the output signals SD and SE of the wave-shaping circuit 314 and 315, this means that the detected bar is wide. As a result, if the detected bar is narrow, the control proceeds to step 903 which stores "0" in the bar code register 36. Contrary to this, if the detected bar is wide, the control proceeds to step 904 which stores "1" in the bar code register 36.

Then, the operation at steps 901 through 904 is repeated during a scanning operation.

Thus, in the third prior art bar code reading system as illustrated in FIGS. 7, 8, 9, 10A and 10B, since a bar is detected simultaneously by the five sensors 201, 202, 203, 204 and 205, a bar width can be accurately detected irrespective of the scanning speed of the bar code scanner 2-C.

In the third prior art bar code reading system, however, since the number of sensors is large, the manufacturing cost of the system is increased.

Figure 11:
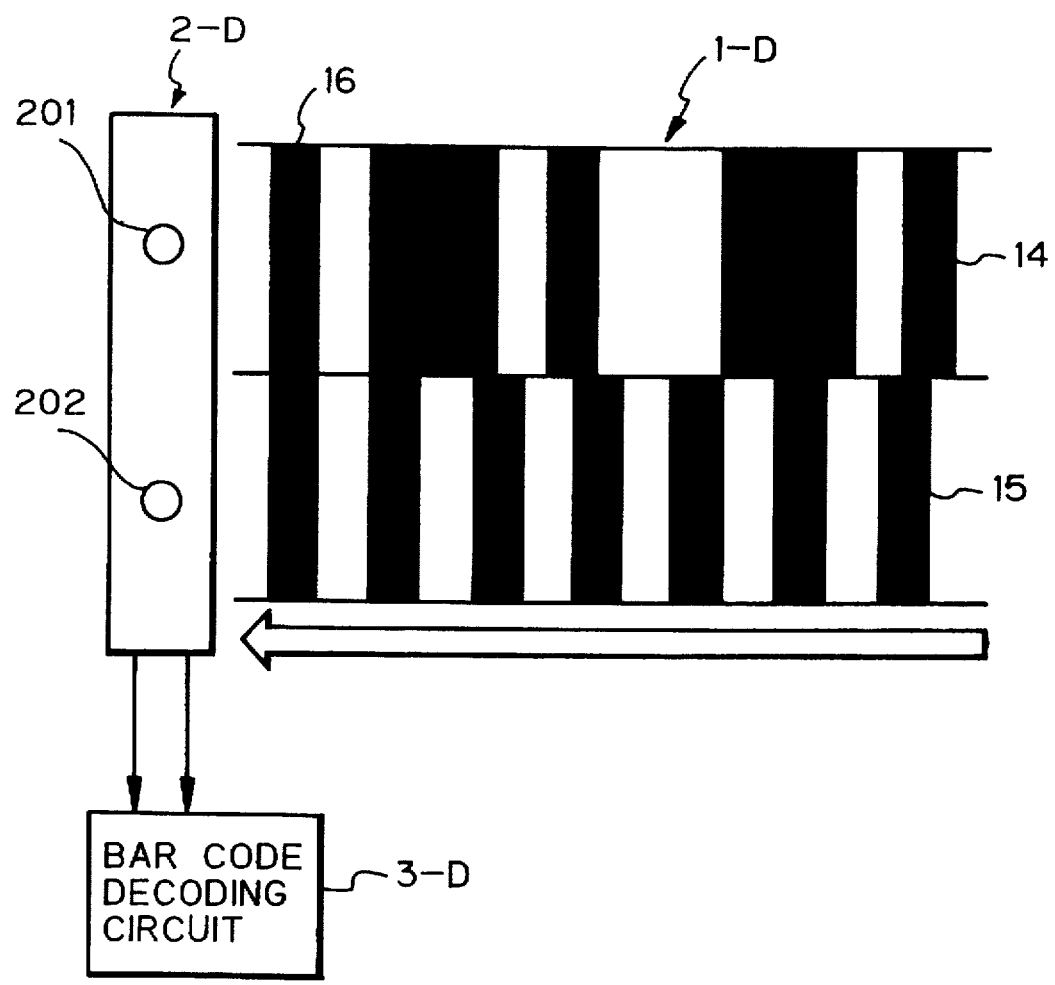
FIG. 11 is a diagram illustrating a fourth prior art bar code reading system.

In FIG. 11, which illustrates a fourth prior art bar code reading system, a bar code 1-D has data bars 14, reference bars 15 and a start bar 16. Also, a bar code scanner 2-D has two sensors 201 and 202 for sensing the data bars 14 and the reference bars 15, respectively. Further, a bar code decoding circuit 3-D is similar to the bar code decoding circuit 3-B of FIG. 5, which will be explained later in detail. Note that the bar code reading system of FIG. 11 can be applied to cassette number information of a VTR library system.

In the data bars 14, the width ratio of a narrow bar to a wide bar is 2/5. Also, in the reference bars 15, the width of each bar is the same as that of the narrow bars of the data bars 14. Further, the width of the start bar 16 is the same as that of the narrow bars of the data bars 14.

The start bar 16 is used for determining the reference width of the data bars 14. That is, even when the sensing of the start bar 16 is completed, the sensing of any bar of the reference bars 15 is incomplete. Therefore, the start bar 16 is forcibly caused to be "0".

Figure 12:
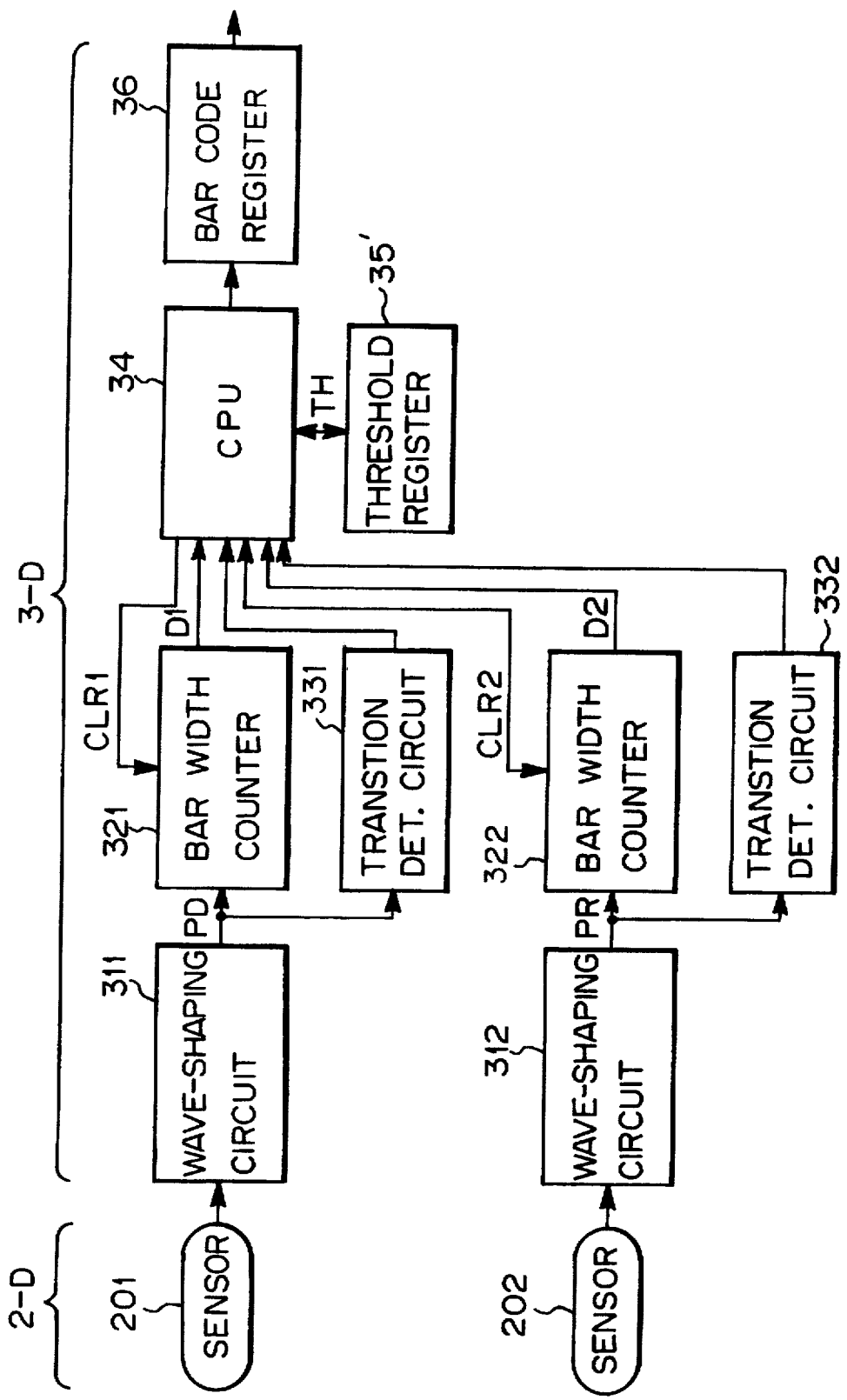
FIG. 12 is a block circuit diagram of the bar code decoding circuit of FIG. 11.

In FIG. 12, which is a detailed block circuit diagram of the bar code decoding circuit 1-D of FIG. 11, a wave-shaping circuit 312 connected to the sensor 202, a bar width counter 322 connected to the wave-shaping circuit 312 and a transition detection circuit 332 connected to the wave-shaping circuit 312 are added to the bar code decoding circuit 3-B of FIG. 5.

The operation of the CPU 34 of FIG. 12 is explained next with reference to FIGS. 13, 14 and 15A through 15E.

Figure 13:
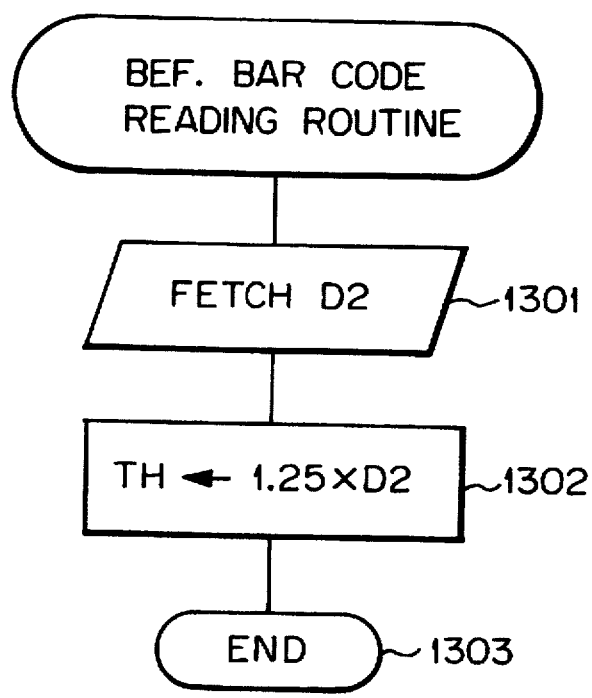
FIGS. 13 and 14 are flowcharts showing the operation of the CPU of FIG. 12.
Figures 15A, 15B, 15C, 15D, 15E:
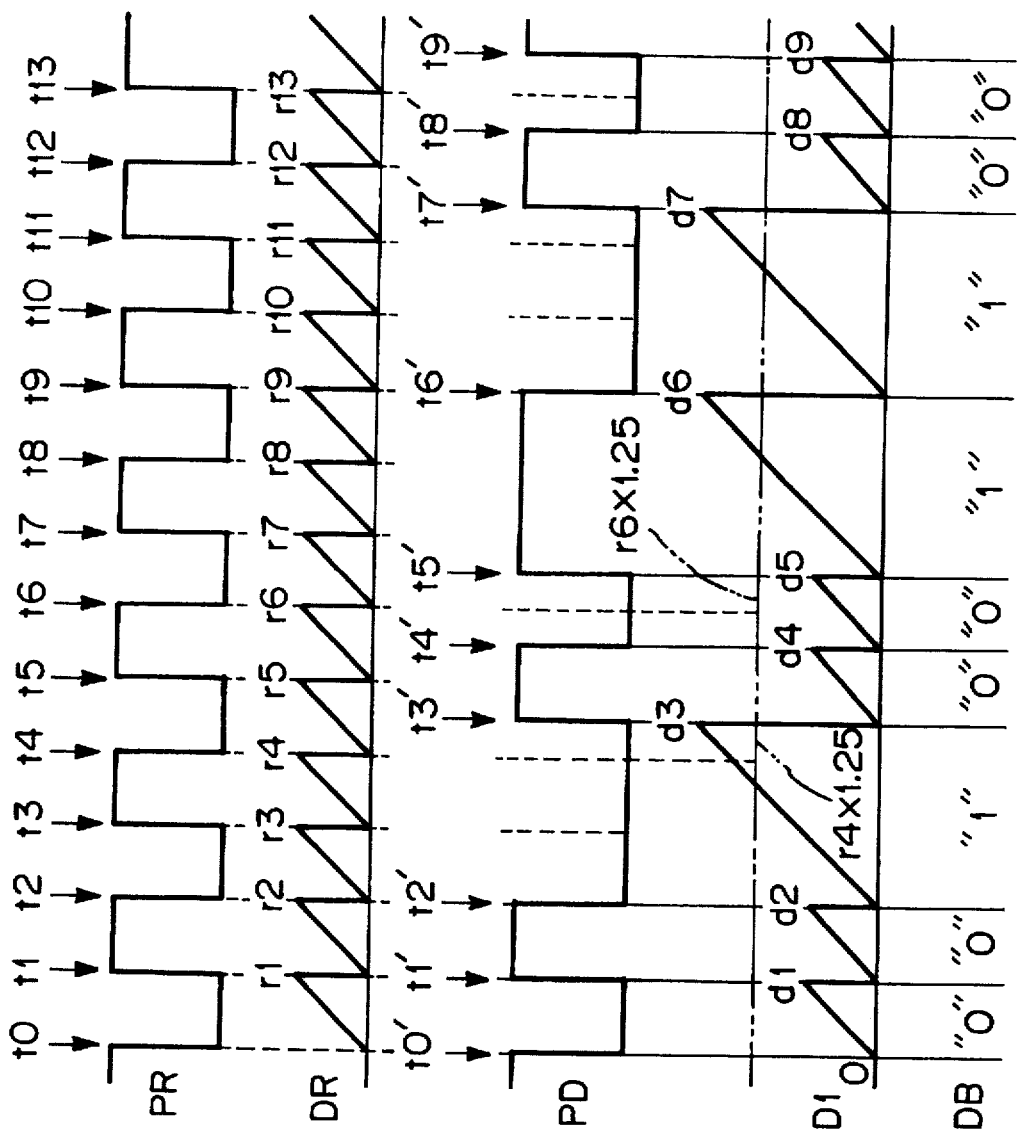
FIGS. 15A through 15E are timing diagrams showing the operation of the CPU of FIG. 12.

The operation shown in the flowchart of FIG. 13 is initiated by the transition signal of the transition detection circuit 332. That is, when the output signal PR of the wave-shaping circuit 312, is changed as shown in FIG. 15A, the operation shown in the flowchart of FIG. 13 is initiated at every time t0, t1, t2, t3, . . . .

First, at step 1301, a bar width data D2 of the reference bars 15 is fetched from the bar width counter 322. Then, the bar width counter 322 is cleared by a clear signal CLR2. In this case, the value D2 of the bar width counter 322 is changed as shown in FIG. 15B.

Next, at step 1302, a threshold value TH is calculated by $$TH \leftarrow 1.25 \times D2$$

Then the threshold value TH is stored in the threshold value register 35'.

Finally, this routine is completed at step 1303.

Note that the coefficient 1.25 at step 1302 depends upon the width ratio of a narrow bar to a wide bar. As stated above, since this width ratio is 2/5, an intermediate value between the narrow bar and the wide bar is represented by $$\text{the narrow bar width} \times (5/2)/2 = \text{the narrow bar width} \times 1.25$$

Thus, the threshold value TH is calculated by the formula at step 1302. Therefore, as shown in FIGS. 15B and 15D, the threshold value TH is calculated by using values r1, r2, r3, . . . .

Figure 14:
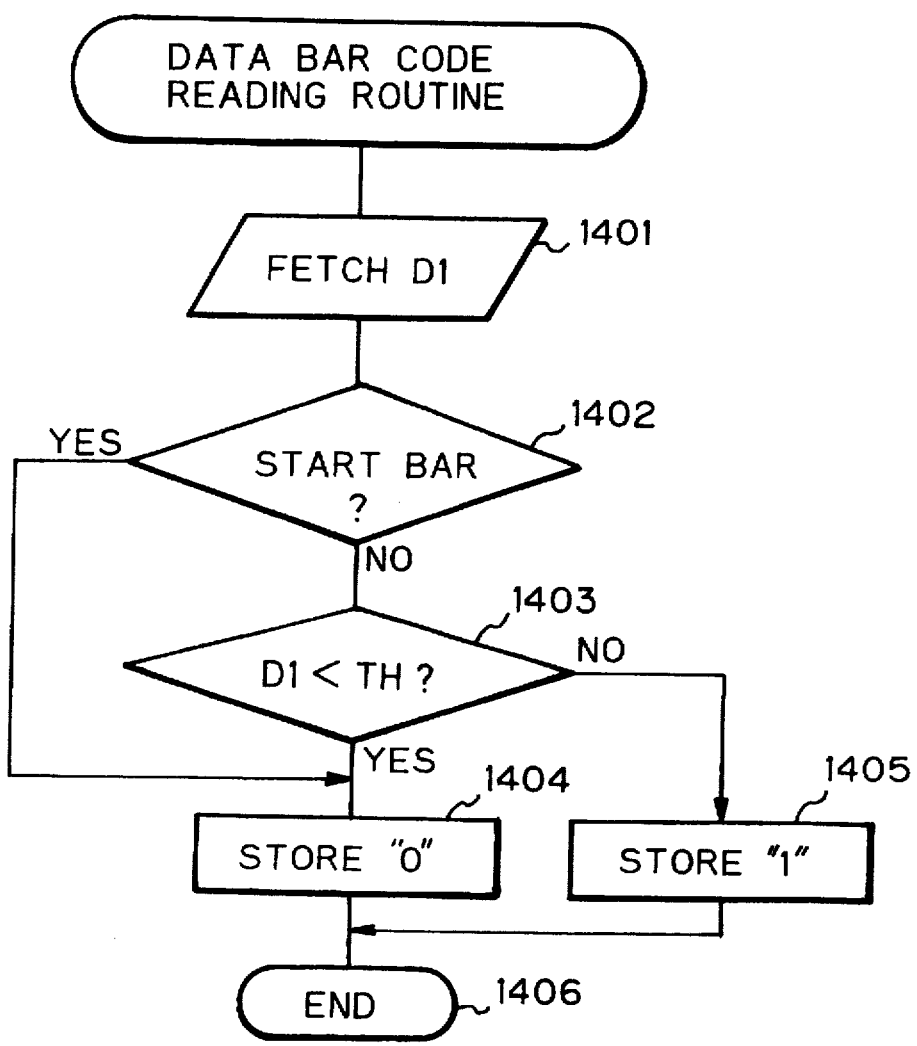

The operation shown in the flowchart of FIG. 14 is initiated by the transition signal of the transition detection circuit 331. That is, when the output signal PD of the wave-shaping circuit 311 is changed as shown in FIG. 15C, the operation shown in the flowchart of FIG. 14 is initiated at every time t0', t1', t2', t3', . . . .

First, at step 1401, a bar width data D1 of the data bars 14 including the start bar 16 is fetched from the bar width counter 321. Then, the bar width counter 321 is cleared by a clear signal CLR1. In this case, the value D1 of the bar width counter 321 is changed as shown in FIG. 15D.

Next, at step 1402, it is determined whether or not a sensed bar is a start bar. Only when the sensed bar is a start bar, does the control proceed directly to step 1404, since the start bar is forcibly caused to be "0". Otherwise, the control proceeds to step 1403.

Next, at step 1403, it is determined whether or not D1 is smaller than the threshold value TH stored in the threshold value register 35'. As a result, when D1<TH, the control proceeds to step 1404 which stores "0" in the bar code register 36. Contrary to this, if D1≧TH, the control proceeds to step 1405 which stores "1" in the bar code register 36.

Finally, this routine is completed at step 1406.

Therefore, bar code data DB as shown in FIG. 15E is stored in the bar code register 36.

Thus, in the fourth prior art bar code reading system as illustrated in FIGS. 11, 12, 13, 14 and 15A through 15E, since the data bars 14 are compared with the reference bars 15 in close proximity to the data bars 14, a bar width of the data bars 14 can be accurately detected irrespective of the scanning speed of the bar code scanner 2-D.

In the fourth prior art bar code reading system, however, since the number of sensors is two, the manufacturing cost of the system is increased. Also, since two kinds of bar codes are required, a label on which such bar codes are printed becomes large, and an erroneous reading operation may occur due to the deviation of the two bar codes on the label.

Figure 16:
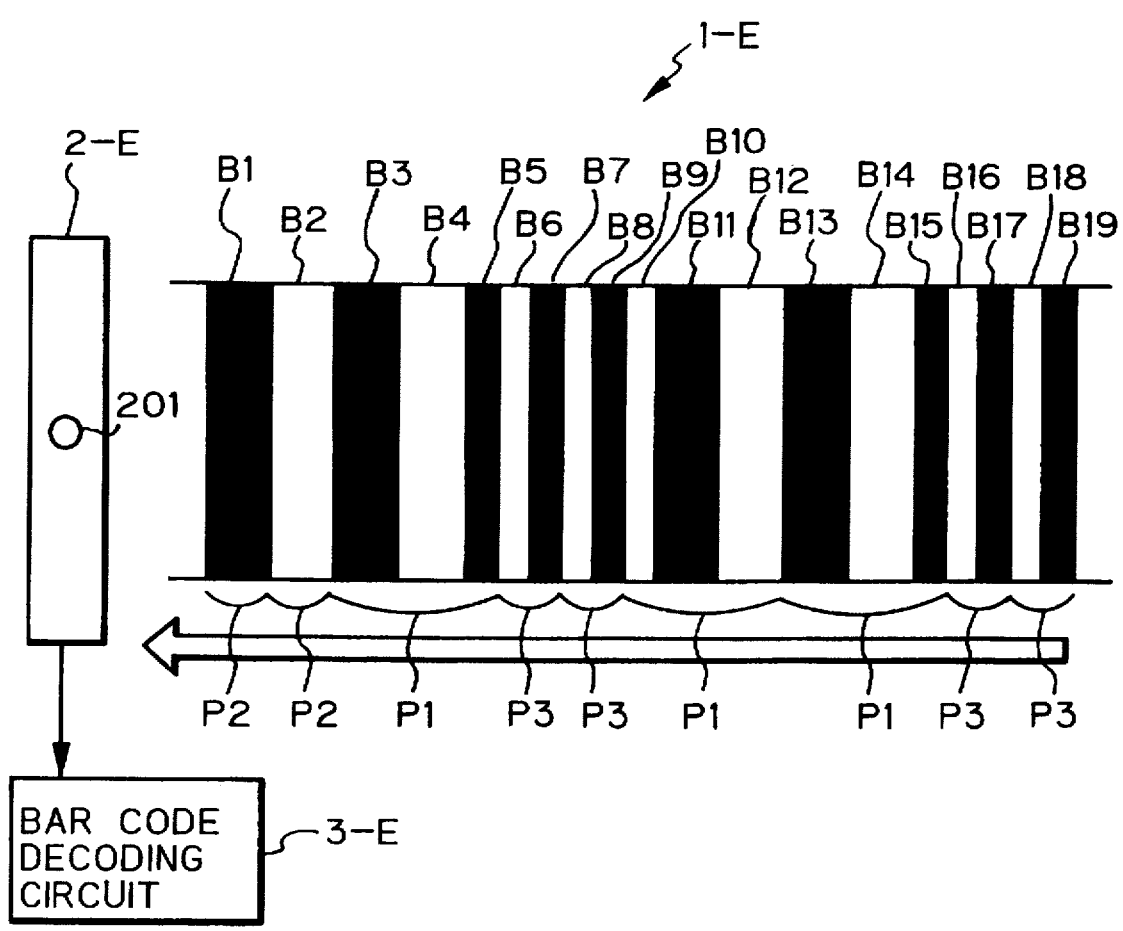
FIG. 16 is a diagram illustrating an embodiment of the bar code reading system according to the present invention.

In FIG. 16, which illustrates an embodiment of the present invention, a bar code 1-E is provided by combining the data bars 14 and the reference bars 15 including the start bar 16 of FIG. 11. Also, a bar code scanner 2-E which is the same as the bar code scanners 2-A and 2-B of FIGS. 1 and 4, is provided. Further, a bar code decoding circuit 3-E which is similar to the bar code decoding circuit 3-B of FIG. 5, is provided.

The bar code 1-E is formed by bars B1, B2, B3, . . . , each of which has a narrow width "N" or a wide width "W". In this case, the bars B5, B6, B7 . . . have the narrow width "N", and the bars B1, B2, B3, B4, . . . have the wide width "W". Also, there are three patterns P1, P2 and P3 of the bars in the bar code 1-E. That is, a pattern P1 consists of "W", "W" and "N" bars, or "N", "W" and "W" bars; a pattern P2 consists of one "W" bar; and a pattern P3 consists of "N" and "N" bars.

Figure 17:
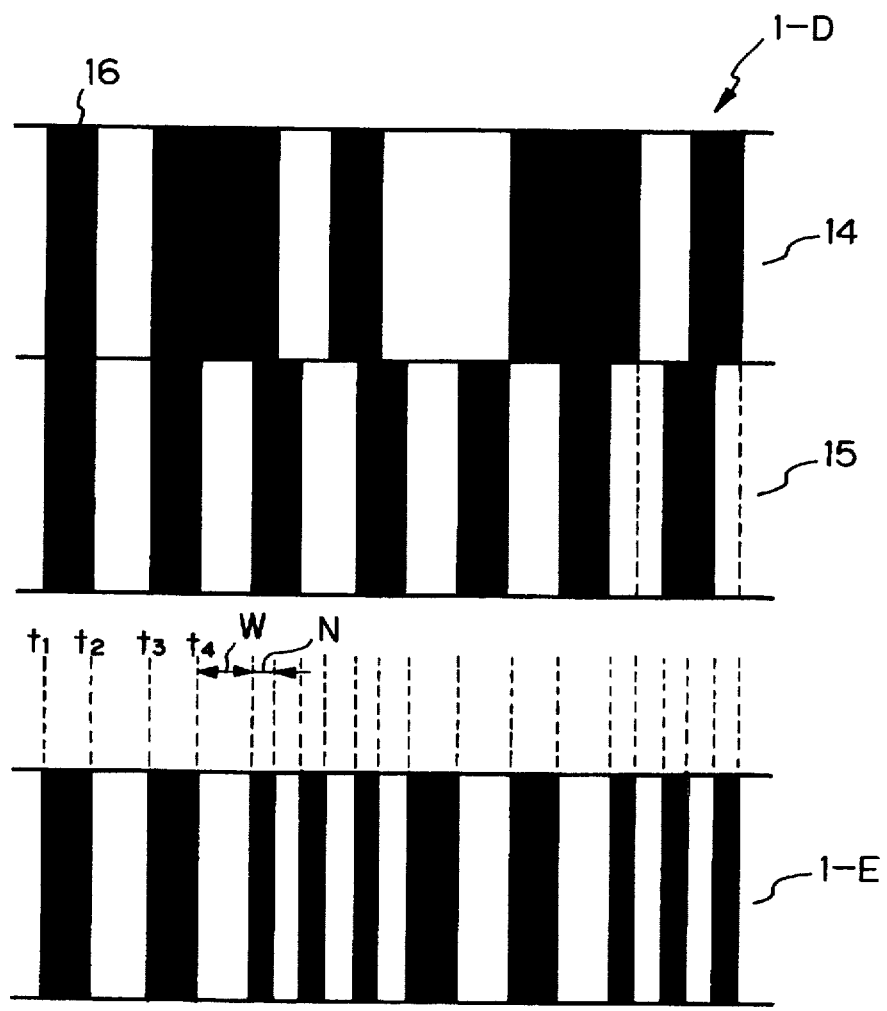
FIG. 17 is a plan view for explaining a method for fabrication of the bar code of FIG. 16.

The formation of the bar code 1-E is explained next with reference to FIG. 17. That is, as stated above, the bar code 1-E is formed by combining the data bars 14 including the start bar 16 with the reference bars 15 of the bar code 1-D of FIG. 11. In this case, transitions from black to white and vice versa of the data bars 14 including the start bar 16 are OR-logically combined with transitions from black to white and vice versa of the reference bars 15, to obtain transitions t1, t2, . . . . . Then, black bars and white bars are alternately allocated between the transitions t1, t2, . . . . As a result, the bar code 1-E also consists of narrow bars and wide bars. In this case, the width ratio of a narrow-bar to a wide bar in the data bars 14 is 2/5. Therefore, if the width of each of the narrow bars is "N" and the width of the wide bars is "W", the width "N" is half the width of each of the reference bars 15, and the width "W" is the same as the width of each of the reference bars 15. As a result, the width ratio of a narrow bar to a wide bar in the bar code 1-E is 1/2.

Figure 18:
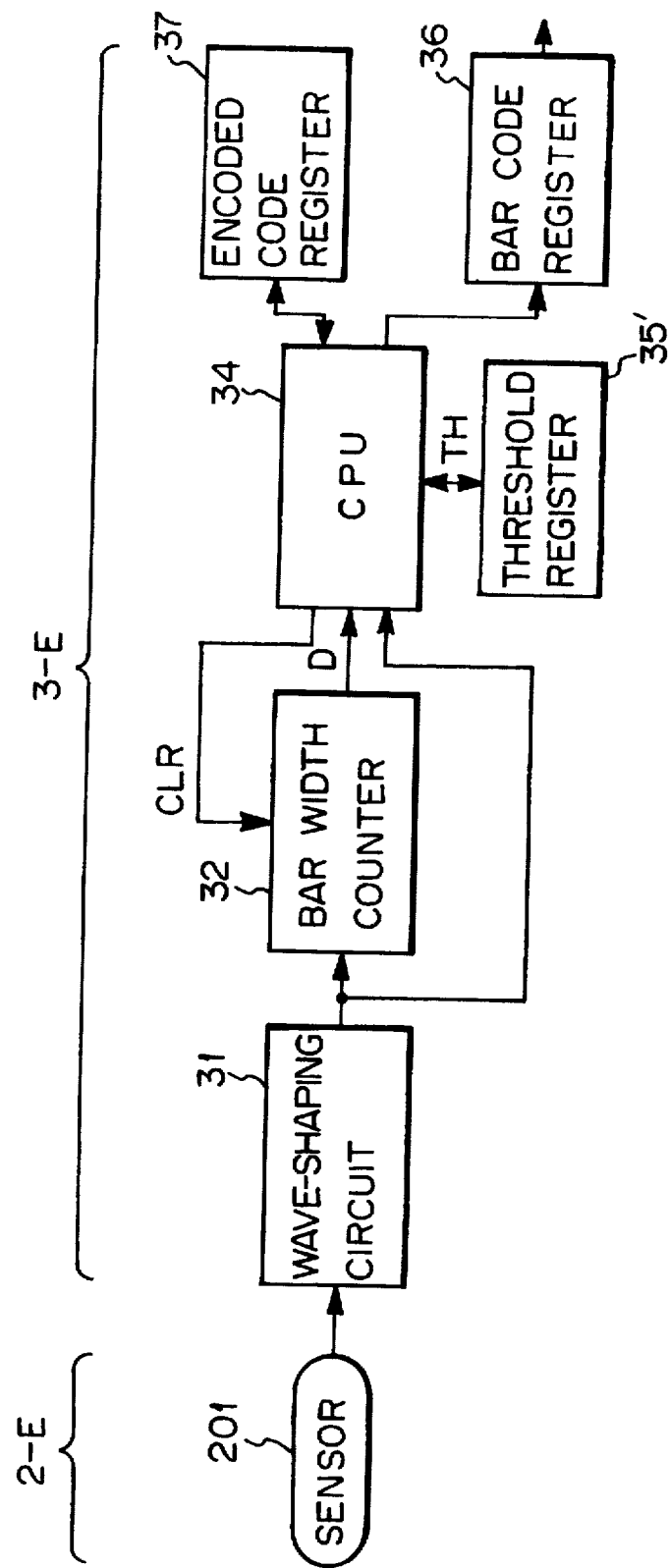
FIG. 18 is a block circuit diagram of the bar code decoding circuit of FIG. 16.

In FIG. 18, which is a detailed block circuit diagram of the bar code decoding circuit 3-E of FIG. 16, the transition detection circuit 33 of FIG. 5 is not provided, and an encoded code register 37 is added to the elements of the bar code decoding circuit 3-B of FIG. 5.

The operation of the CPU 34 of FIG. 18 is explained next with reference to FIG. 19, 20, 21, and 22A through 22D.

Figure 19:
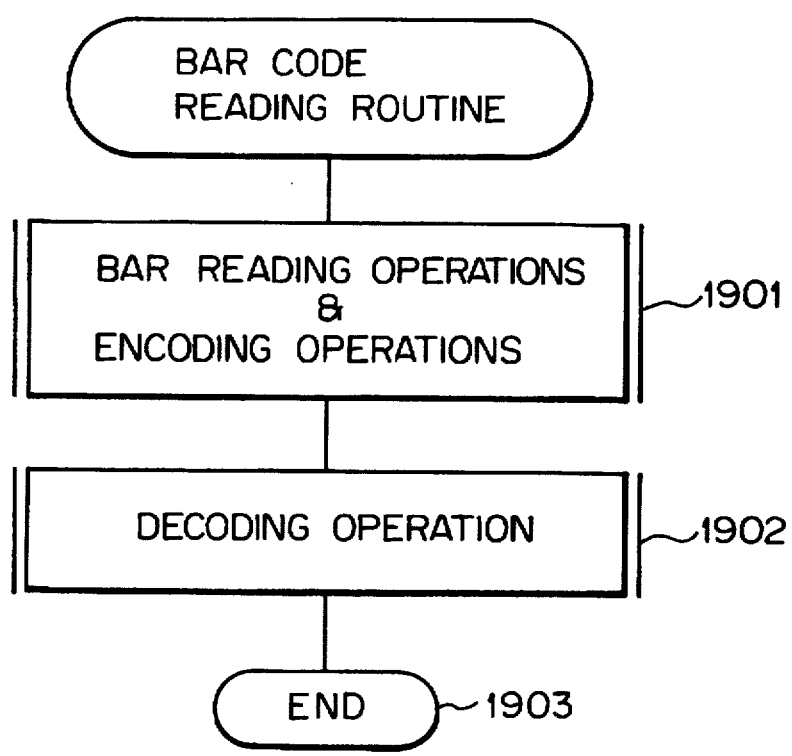
FIGS. 19, 20 and 21 are flowcharts showing the operation of the CPU of FIG. 18.

The operation shown in the flowchart of FIG. 19 is initiated by a change of the output signal of the sensor 201 or the like.

First, at step 1901, bar reading operations and encoding operations are performed upon all the bars of the bar code 1-E. This will be explained later in detail.

Next, at step 1902, a decoding operation is performed upon encoded data obtained at step 1902. This also will be explained later in detail.

Finally, this routine is completed at step 1903.

Figure 20:
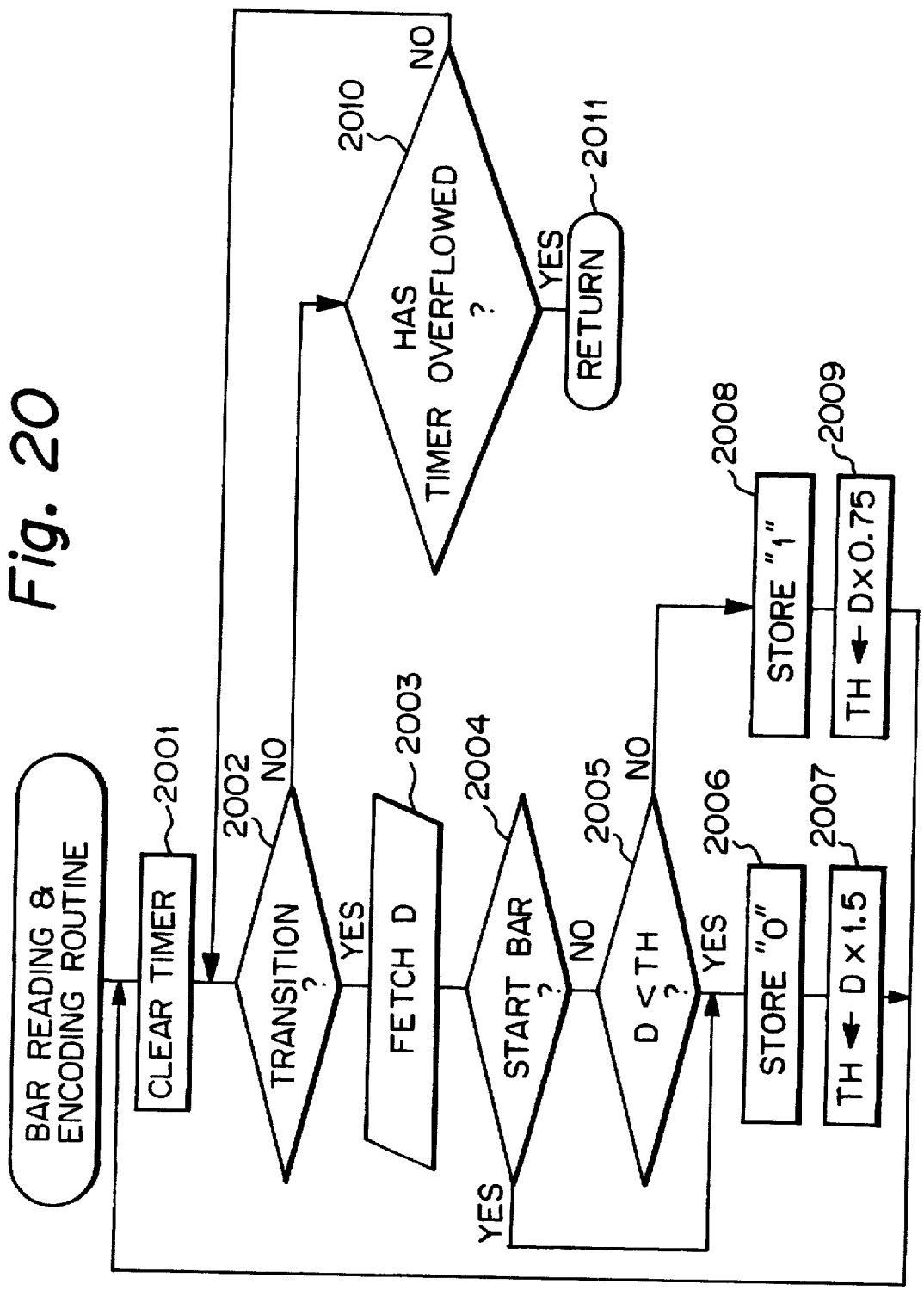

FIG. 20 is a detailed flowchart of the bar reading and encoding step 1901 of FIG. 19.

First, at step 2001, a timer (not shown) is cleared. Note that the timer monitors an output signal PD of the wave-shaping circuit 31. If the output signal PD does not change for a definite time period so that the timer overflows, it is deemed that bar reading and encoding operations upon all bars are completed.

Figure 22:
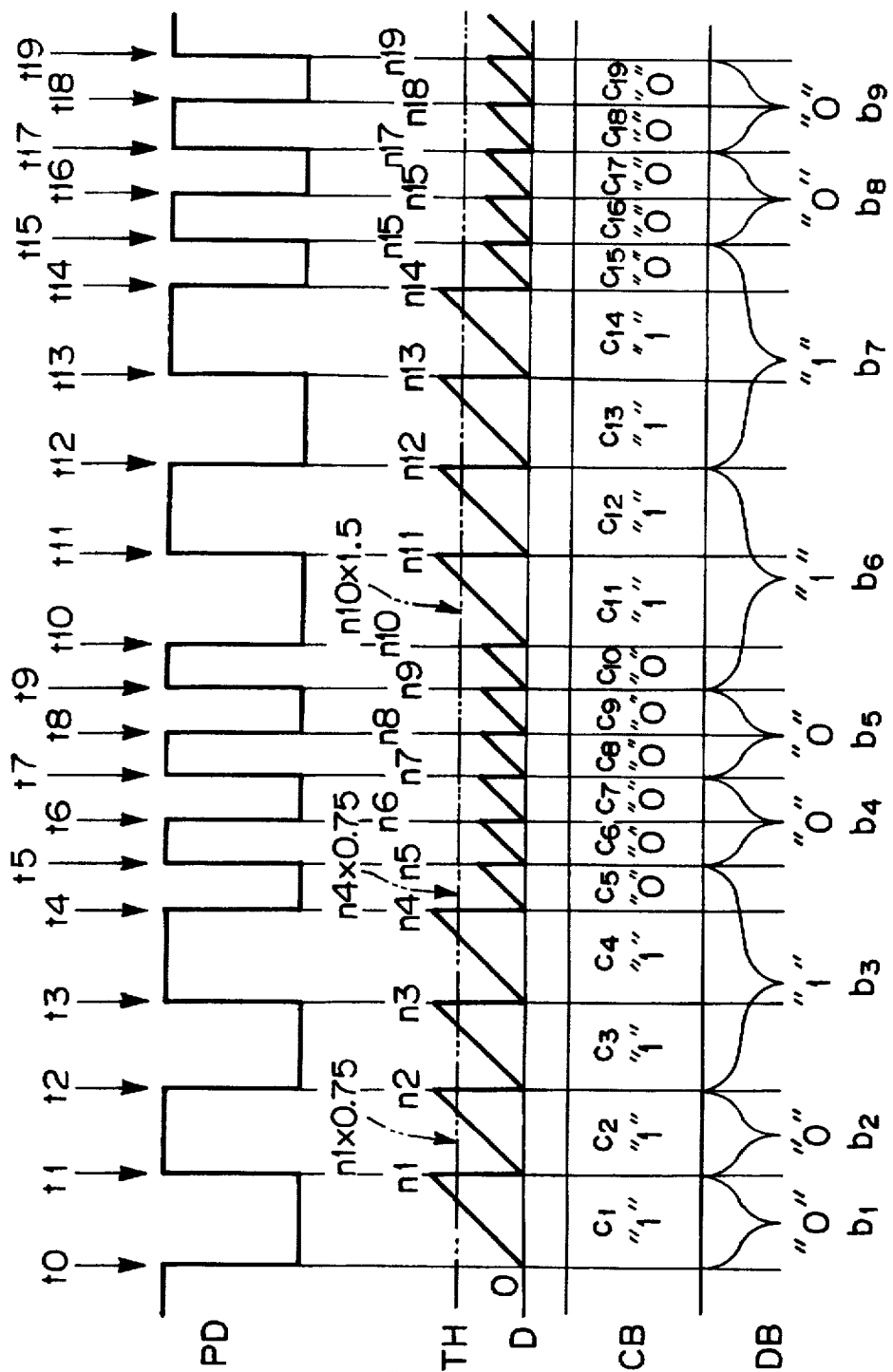
FIGS. 22A through 22D are timing diagrams showing the operation of the CPU of FIG. 18.

Next, at step 2002, the CPU 34 determines whether or not the output signal PD of the wave-shaping circuit 31 is switched from low to high or vice versa. Note that the output signal PD of the wave-shaping circuit 31 is changed as shown in FIG. 22A. Therefore, at time t1, t2, . . . , the control proceeds to step 2003. Otherwise, the control proceeds to step 2010 which determines whether or not the timer has overflowed, i.e., whether or not all the bars are read and encoded.

Next, at step 2003, a bar width data D of the bars B1, B2, . . . is fetched from the bar width counter 32. Then, the bar width counter 32 is cleared by a clear signal CLR.

Next, at step 2004, it is determined whether or not a sensed bar is a start bar. Only when the sensed bar is a start bar, does the control proceed directly to step 2006, since the start bar is forcibly caused to be "0". Other wise, the control proceeds to step 2005.

Next, at step 2005, it is determined whether or not D is smaller than the threshold value TH stored in the threshold value register 35'.

As a result, when D<TH, the control proceeds to step 2006 which stores "0" in the encoded code register 37. Next, at step 2007, a threshold value TH is calculated by $$TH \leftarrow D \times 1.5$$

Then, the threshold value TH is stored in the threshold value register 35'.

Contrary to this, if D≧TH, the control proceeds to step 2008 which stores "1" in the encoded code register 37. Next, at step 2009, a threshold value TH is calculated by $$TH \leftarrow D \times 0.75$$

Then, the threshold value TH is stored in the threshold value register 35'.

Then, the control returns to step 2001.

If no transition occurs at the output signal PD of the wave-shaping circuit 31, the timer overflows so that the control at step 2002 proceeds via step 2010 to step 2011. Thus, the control returns to step 1902 of FIG. 19.

For example, the bar width data D of the bar width counter 32 is changed as shown in FIG. 22B. In this case, the threshold value TH is as shown in FIG. 22B. Therefore, encoded code data CB stored in the encoded code register 37 is a shown in FIG. 22C.

Note that the coefficient 1.5 at steps 2007 and 2009 depends upon the width ratio of a narrow bar to a wide bar. As stated above, since this width ratio is 1/2, an intermediate value between the narrow bar and the wide bar is represented by the narrow bar width×1.5;

and the wide bar width/1.5=the wide bar width×0.75

Thus, the threshold value TH is calculated by the formulas at steps 2007 and 2009. Therefore, as shown in FIG. 22B, the threshold value TH is calculated by using values n1, n2, n3, . . . .

Figure 21:
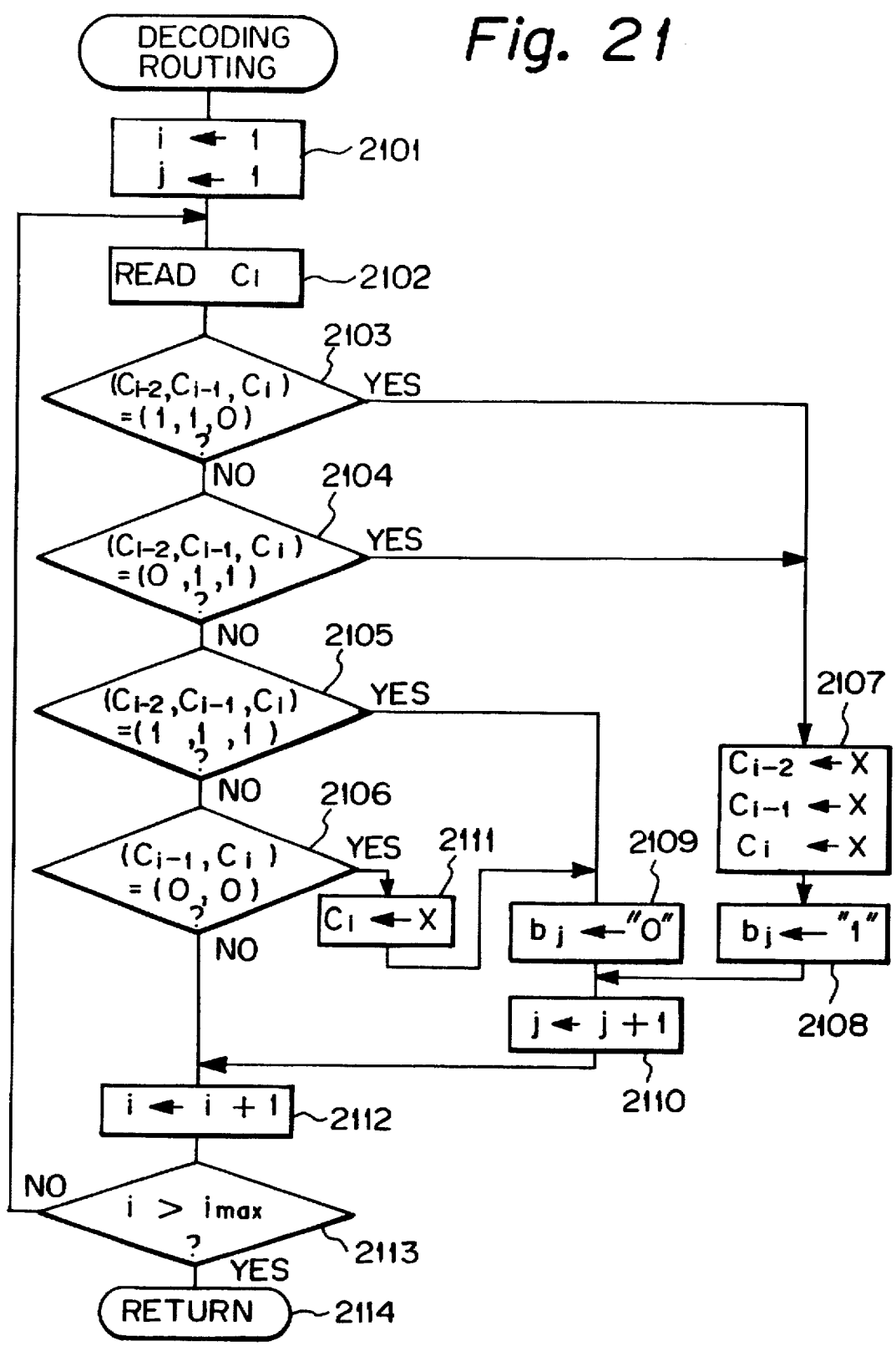

FIG. 21 is a detailed flowchart of the decoding step 1902 of FIG. 19.

First, at step 2101, values i and J are initialized. That is, the values i and J are both caused to be 1.

Next, at step 2102, the CPU 34 reads the encoded data $C_i$ from the encoded code register 37.

Steps 2103 and 2104 determine whether or not the encoded data $C_i$ is related to the pattern P1 of FIG. 16. Also, step 2105 determines whether or not the encoded data $C_i$ is related to the pattern P2 of FIG. 16. Further, step 2106 determines whether or not the encoded data $C_i$ is related to the pattern P3 of FIG. 16.

When the encoded data $C_i$ is related to the pattern P1, bar code data $b_j$ is caused to be "1" by steps 2107 and 2108. Also, when the encoded data $C_i$ is related to the pattern P2, bar code data $b_j$ is caused to be "0" by step 2109. Further, when the coded data $C_i$ is related to the pattern P3, bar code data $b_j$ is caused to be "0" by steps 2109 and 2111.

Steps 2102 through 2109 are repeated by steps 2111, 2112 and 2113 until all the encoded data $C_i$ (i=1 to imax) are processed.

Then, at step 2114, the control returns to step 1903.

The flowchart of FIG. 21 is explained next in detail with reference to FIGS. 22C and 22D.

First, the encoded data $C_1$ (="1") is read from the encoded code register 37 at step 2102. In this case, since $C_{-1}$ and $C_0$ are X (neither "0" nor "1"), the control proceeds via steps 2103 through 2106 to step 2112 which increments the value i by+1. That is, i=2. Then, the control returns via step 2113 to step 2102.

Next, the encoded data $C_2$ (="1") is read from the encoded code register 37 at step 2102. In this case, since $C_0$ and $C_1$ are X and "1", respectively, the control also proceeds via steps 2103 through 2106 to step 2112 which increments the value i by+1. That is, i=3. Then, the control returns via step 2113 to step 2102.

Next, the encoded data $C_3$ (="1") is read from the encoded code register 37 at step 2102. In this case, since ($C_1$, $C_2$, $C_3$)=(1, 1, 1), the control proceeds via step 2105 to step 2109 which causes $b_1$ to be "0". Then, at step 2110, the value j is incremented by+1, i.e., j=2. Further, at step 2112, the value i is incremented by+1, i.e., i=4. Then, the control returns via step 2113 to step 2102.

Next, the encoded data $C_4$ (="1") is read from the encoded code register 37 at step 2102. In this case, since ($C_2$, $C_3$, $C_4$)=(1, 1, 1), the control proceeds via step 2105 to step 2109 which causes $b_2$ to be "0". Then, at step 2110, the value j is incremented by+1, i.e., j=3. Further, at step 2112, the value i is incremented by+1, i.e., i=5. Then, the control returns via step 2113 to step 2102.

Next, the encoded data $C_5$ (="0") is read from the encoded code register 37 at step 2102. In this case, silce ($C_3$, $C_4$, $C_5$)=(1, 1, 0), the control proceeds via step 2103 to steps 2107 and 2108. That is, at step 2107, $C_3$, $C_4$ and $C_5$ are caused to be "X", and at step 2108, $b_3$ is caused to be "1". Then, at step 2110, the value j is incremented by+1, i.e., j=4. Further, at step 2112, the value i is incremented by+1, i.e., i=6. Then, the control returns via step 2113 to step 2102.

Next, the encoded data $C_6$ (="0") is read from the encoded code register 37 at step 2102. In this case, since $C_5$ and $C_6$ are X and "0", respectively, the control proceeds via steps 2103 through 2106 to step 2112 which increments the value i by+1. That is, i=7. Then, the control returns via step 2113 to step 2102.

Next, the encoded data $C_7$ (="0") is read from the encoded code register 37 at step 2102. In this case, since ($C_6$, $C_7$)=(0, 0), the control proceeds via step 2106 to steps 2111 and 2109. That is, at step 2111, $C_7$ is caused to be "X", and at step 2109, $b_4$ is caused to be "0". Then, at step 2110, the value j is incremented by+1, i.e., j=5. Further, at step 2112, the value i is incremented by+1, i.e., i=8. Then, the control returns via step 2113 to step 2102.

Next, the encoded data $C_8$ (="0") is read from the encoded code register 37 at step 2102. In this case, since $C_7$ and $C_8$ are X and "0", respectively, the control proceeds via steps 2103 through 2106 to step 2112 which increments the value i by+1. That is, i=9. Then, the control returns via step 2113 to step 2102.

Next, the encoded data $C_9$ (="0") is read from the encoded code register 37 at step 2102. In this case, since ($C_8$, $C_9$)=(0, 0), the control proceeds via step 2106 to steps 2111 and 2109. That is, at step 2111, $C_9$ is caused to be "X", and at step 2109, $b_5$ is caused to be "0". Then, at step 2110, the value j is incremented by+1, i.e., j=6. Further, at step 2112, the value i is incremented by+1, i.e., i=9. Then, the control returns via step 2113 to step 2102. Next, the encoded data $C_{10}$ (="0") is read from the encoded code register 37 at step 2102. In this case, since $C_9$ and $C_{10}$ are X and "0", respectively, the control proceeds via steps 2103 through 2106 to step 2112 which increments the value i by+1. That is, i=11. Then, the control returns via step 2113 to step 2102.

Next, the encoded data $C_{11}$ (="1") is read from the encoded code register 37 at step 2102. In this case, since $C_{11}$ and $C_{11}$ are "0" and "1", respectively, the control also proceeds via steps 2103 through 2106 to step 2112 which increments the value i by+1. That is, i=12. Then, the control returns via step 2113 to step 2102.

Next, the encoded data $C_{12}$ (="1") is read from the encoded code register 37 at step 2102. In this case, silce ($C_{10}$, $C_{11}$, $C_{12}$)=(0, 1, 1), the control proceeds via step 2103 to steps 2107 and 2108. That is, at step 2107, $C_3$, $C_4$ and $C_5$ are caused to be "X", and at step 2108, $b_6$ is caused to be "1". Then, at step 2110, the value j is incremented by+1, i.e., j=7. Further, at step 2112, the value i is incremented by+1, i.e., i=13. Then, the control returns via step 2113 to step 2102.

The encoded data $C_{13}$, $C_{14}$, . . . , $C_{19}$ are the same as the encoded data $C_3$, $C_4$, . . . , $C_9$, respectively. Therefore, bar code data $b_7$, $b_8$ and $b_9$ (="1", "0" and "0") the same as the bar code data $b_3$, $b_4$ and $b_5$ are obtained.

If $i_{max}$=9, the control returns via step 2114 to step 1902 of FIG. 19.

Note that, at steps 2108 and 2109, the CPU 34 stores calculated bar code data in the bar code register 36.

Thus, the bar code data (001001100) is obtained in the bar code register 36.

Figure 23:
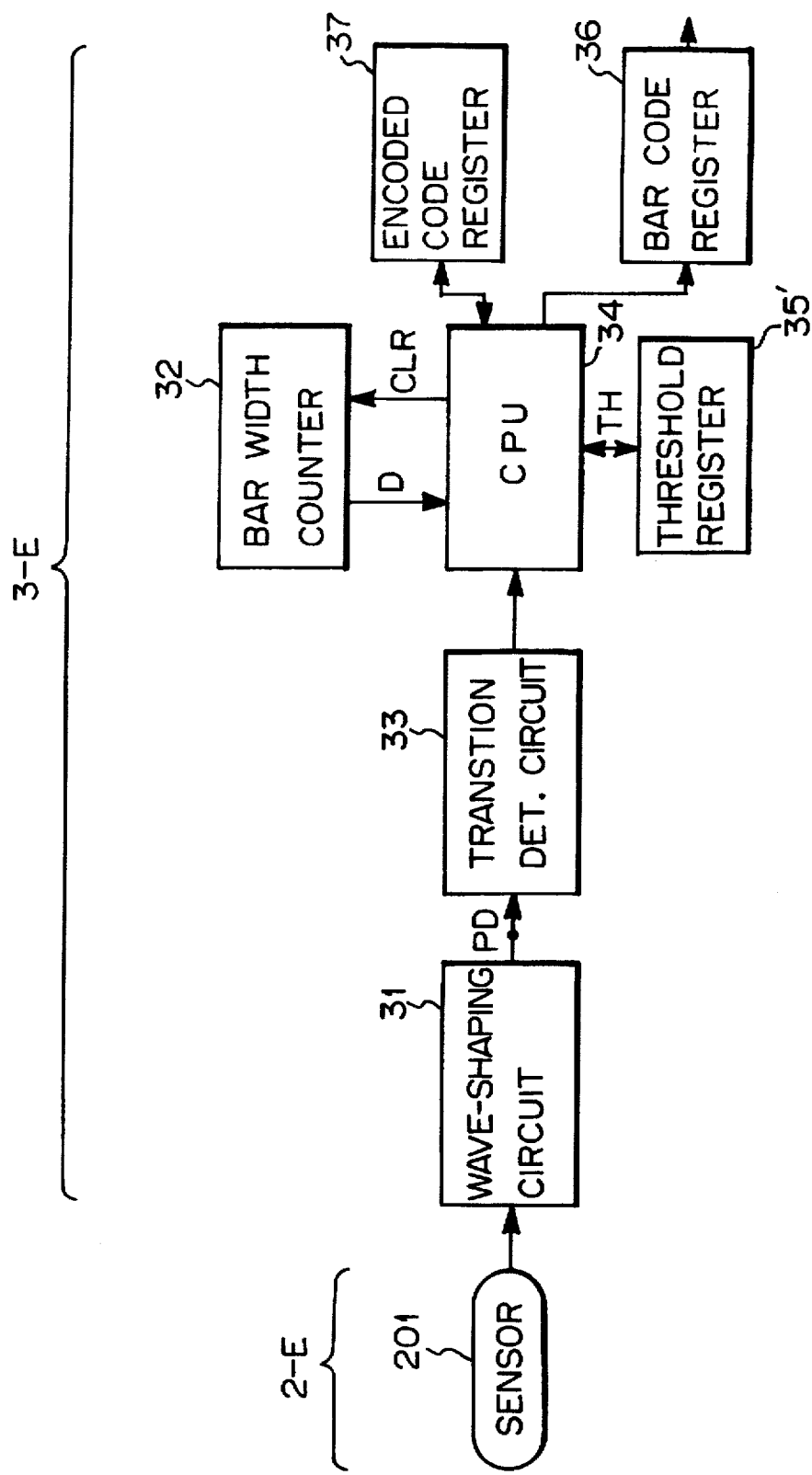
FIG. 23 is a block circuit diagram illustrating a modification of the bar code decoding circuit of FIG. 18.

In FIG. 23, which is a modification of the bar code decoding circuit 3-E of FIG. 18, a transition detection circuit 33 is provided to detect a transition of the output signal PD of the wave-shaping circuit 31. The transition signal of the transition detection circuit 33 is supplied as an interrupt signal to the CPU 34. In this case, the routine of FIG. 19 is replaced by a routine of FIG. 24, and the routine of FIG. 20 is replaced by a routine of FIG. 25.

Figure 24:
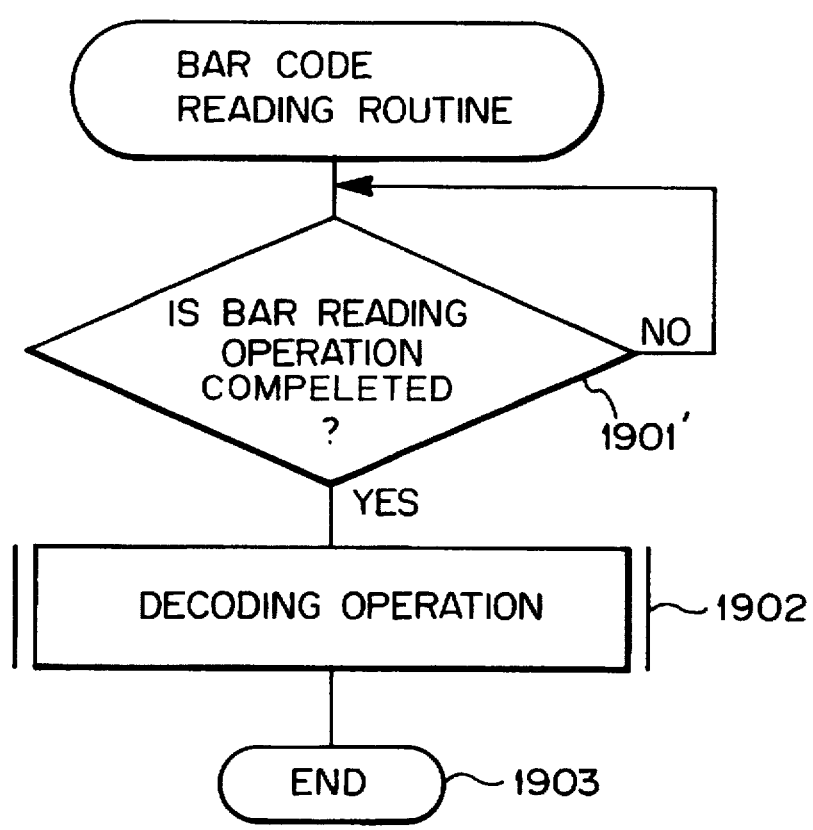
FIGS. 24 and 25 are flowcharts showing the operation of the CPU of FIG. 23
Figure 25:
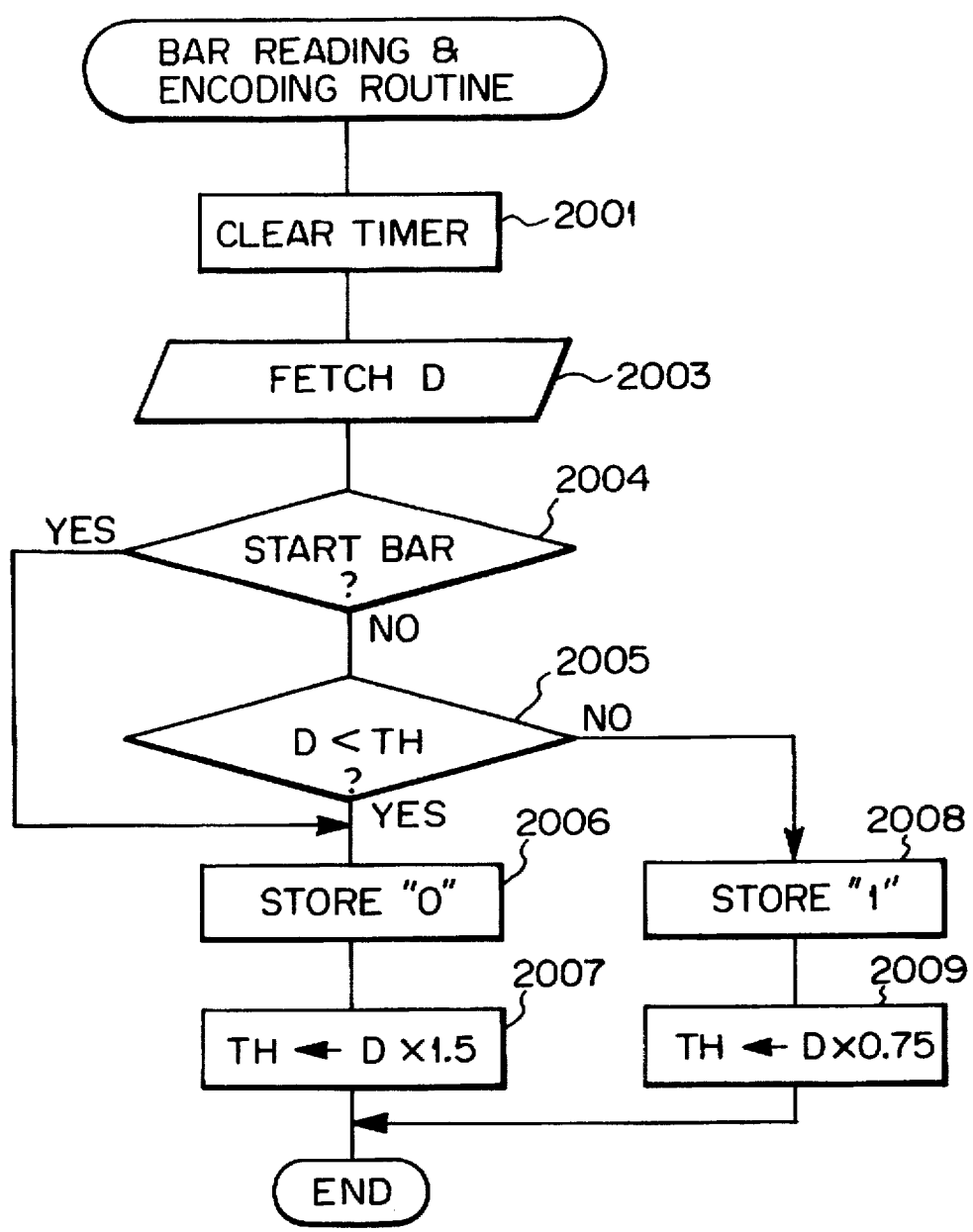

That is, in FIG. 24, at step 1901' it is determined whether a bar reading and encoding operation for all the bars is completed by monitoring the timer or the like. Only when the bar reading and encoding operation is completed, does the control proceed to step 1902. Also, in FIG. 25, since this routine is initiated by the transition signal of the transition detection circuit 33, steps 2002, 2010 and 2011 of FIG. 20 are unnecessary.

As explained hereinabove, according to the present invention, since the threshold value is calculated in accordance with the currently read bar, even if the scanning speed of the bar code scanner greatly fluctuates, it is possible to accurately determine the bar width of the bars irrespective of the scanning speed. In addition, since the number of sensors is only one, the manufacturing cost of the system can be remarkably reduced.

I claim:

1. A method for forming a bar code, comprising the steps of;

preparing a data pattern comprised of narrow bars and wide bars, a width ratio of one of said narrow bars to one of said wide bars being definite;

preparing a reference pattern comprised of reference bars each having a same width as said narrow bars;

OR-logically extracting transitions of bars from a parallel combination of said data pattern and said reference pattern; and allocating black level bars and white level bars alternately between said transistions.

2. The method as set forth in claim 1, wherein the width ratio of one of said narrow bars to one of said wide bars is 2/5.

3. The method as set forth in claim 1, wherein a width ratio of a narrow one of said black level and white level bars to a wide one of said black level and white level bars is 1/2.

4. The method as set forth in claim 1, wherein each narrow one of said black level and white level bars represents a first encoded bar and each wide one of said black level and white level bars represents a second encoded bar, a first combination of one of said first encoded bars and two of said second encoded bars representing a first code data, a second combination of two of said first encoded bars representing a second code data, each of said second encoded bars except for said first combination representing said second code data.

5. A method for reading a bar code formed by preparing a data pattern comprised of narrow bars and wide bars, a width ratio of one of said narrow bars to one of said wide bars being definite, preparing a reference pattern comprised of reference bars each having a same width as said narrow bars, OR-logically extracting transitions of bars from a parallel combination of said data pattern and said reference pattern, and allocating black level bars and white level bars alternately between said transistions, said method comprising the steps of:

- detecting a transition of bars of said bar code;
- measuring a width of one of said black level and white level bars immediately before said transition;
- determining whether or not the measured width is smaller than a threshold value;
- storing a first encoded value, when the measured width is smaller than said threshold value;
- renewing said threshold value by multiplying said threshold value by a first coefficient, when the measured width is smaller than said threshold value;
- storing a second encoded value, when the calculated width is not smaller than said threshold value;
- renewing said threshold value by multiplying said threshold value by a second coefficient smaller than said first coefficient, when the measured width is not smaller than said threshold value; and
- decoding said stored encoded values.

6. The method as set forth in claim 5, wherein said decoding step comprises the steps of:

- determining whether or not a first part of said stored encoded values constitutes a first combination of one of said first encoded values and two of said second encoded values;
- causing said first part of said stored encoded values to be a first code value, when said first part of said stored encode values constitutes said first combination;
- determining whether or not a second part of said stored encoded values constitutes a second combination of two of said first encoded values;
- causing said second part of said stored encoded values to be a second code value, when said second part of said stored encode values constitutes said second combination; and
- causing each of said stored second encoded values except for said first part to be said second code value.

7. The method as set forth in claim 5, further comprising the steps of:

- determining whether or not said one of said black level and white level bars immediately before said transition is a start bar; and
- storing said first encoded value, when said one of said black level and white level bars immediately before said transition is a start bar.

8. An apparatus for reading a bar code, formed by preparing a data pattern comprised of narrow bars and wide bars, a width ratio of one of said narrow bars to one of said wide bars being definite, preparing a reference pattern comprised of reference bars each having a same width as said narrow bars, OR-logically extracting transitions of bars from a parallel combination of said data pattern and said reference pattern, and allocating black level bars and white level bars alternately between said transistions, said apparatus comprising:

- a sensor for detecting a transition of bars of said bar code;
- means for measuring a width of one of said black level and white level bars immediately before said transition;
- a threshold value register for storing a threshold value;
- an encoded cede register for storing encoded values;
- a bar code register for storing a bar code;
- control means, connected to said measuring means, said threshold value register, said encoded code register and said bar code register, for comparing the measured width with said threshold value to store said encoded values, renewing said threshold value in accordance with a comparison result of the measure width with said threshold value, and decoding said encoded values to store decoded data in said bar code register.

9. The apparatus as set forth in claim 8, wherein said control means comprises:

- means for determining whether or not the measured width is smaller than said threshold value;
- means for storing a first encoded value in said encoded code register, when the calculated width is smaller than said threshold value;
- means for renewing said threshold value in said threshold value register by multiplying said threshold value by a first coefficient when the calculated width is smaller than said threshold value;
- means for storing a second encoded value in said encoded code register, when the calculated width is not smaller than said threshold value; and
- means for renewing said threshold value in said threshold value register by multiplying said threshold value by a second coefficient smaller than said first coefficient, when the calculated width is not smaller than said threshold value.

10. The apparatus as set forth in claim 9, wherein said control means comprises:

- means for determining whether or not a first part of said stored encoded values constitutes a first combination of one of said first encoded values and two of said second encoded values;
- means for causing said first part of said stored encoded values to be a first code value, when said first part of said stored encode values constitutes said first combination;
- means for determining whether or not a second part of said stored encoded values constitutes a second combination of two of said first encoded values;
- means for causing said second part of said stored encoded values to be a second code value, when said second part of said stored encode values constitutes said second combination; and
- means for causing each of said stored second encoded values except for said first part to be said second code value.

11. The apparatus as set forth in claim 8, further comprising:

- means for determining whether or not said one of said black level and white level bars immediately before said transition is a start bar; and
- means for storing said first encoded value in said encoded code register, when said one of said black level and white level bars immediately before said transition is a start bar.

* * * * *

UNITED STATES PATENT AND TRADEMARK OFFICE
CERTIFICATE OF CORRECTION

PATENT NO. : 5,801,369
DATED : September 1, 1998
INVENTOR(S) : Satoko Akeda

It is certified that error appears in the above-identified patent and that said Letters Patent is hereby corrected as shown below:

Column 9, Line 47: "Next, the encoded.." should begin a new paragraph

Column 12, Line 1: "cede" should read --code--

In the Drawings, Figure 2: "Transtion" should read --Transition--

In the Drawings, Figure 5: "Transtion" should read --Transition--

In the Drawings, Figure 12, Box 331: "TRANSTION" should read --TRANSITION--

In the Drawings, Figure 12, Box 332: "TRANSTION" should read --TRANSITION--

In the Drawings, Figure 23, Box 33: "TRANSTION" should read --TRANSITION--

In the Drawings, Figure 24: "COMPLETED" should read --completed--

Signed and Sealed this

Twentieth Day of June, 2000

*Attest:*

Q. TODD DICKINSON

*Attesting Officer*   *Director of Patents and Trademarks*